US012644257B2

(12) United States Patent
Cao et al.

(10) Patent No.: US 12,644,257 B2
(45) Date of Patent: Jun. 2, 2026

(54) SENSOR INSTALLATION CALIBRATION FOR SIX-WAY BLADE MONITORING

(71) Applicant: Honeywell International Inc., Charlotte, NC (US)

(72) Inventors: Xiao Cao, Shanghai (CN); Yanling Min, Shanghai (CN); Zhizhen Shen, Shanghai (CN); Jingwei Li, Pizhou (CN); Siqin Yu, Shanghai (CN)

(73) Assignee: Honeywell International Inc., Charlotte, NC (US)

( * ) Notice: Subject to any disclaimer, the term of this patent is extended or adjusted under 35 U.S.C. 154(b) by 80 days.

(21) Appl. No.: 18/517,954

(22) Filed: Nov. 22, 2023

(65) Prior Publication Data

US 2025/0163682 A1 May 22, 2025

(51) Int. Cl.
| | |
|---|---|
| *E02F 9/26* | (2006.01) |
| *E02F 3/76* | (2006.01) |
| *E02F 3/84* | (2006.01) |
| *G01P 15/18* | (2013.01) |
| *G01S 19/13* | (2010.01) |

(52) U.S. Cl.
CPC ............ *E02F 9/264* (2013.01); *E02F 3/7613* (2013.01); *E02F 3/7618* (2013.01); *E02F 3/844* (2013.01); *G01P 15/18* (2013.01); *G01S 19/13* (2013.01)

(58) Field of Classification Search
CPC ....... E02F 9/264; E02F 3/7613; E02F 3/7618; E02F 3/844; G01P 15/18; G01S 19/13
See application file for complete search history.

(56) References Cited

U.S. PATENT DOCUMENTS

| | | | |
|---|---|---|---|
| 9,988,787 | B1 | 6/2018 | Wang et al. |
| 10,316,491 | B2 | 6/2019 | Gentle et al. |
| 10,962,360 | B2 | 3/2021 | Olgesby et al. |
| 10,968,606 | B2 | 4/2021 | Green |
| 11,629,476 | B2 | 4/2023 | Zhao et al. |
| 2004/0221490 | A1 | 11/2004 | Cooper et al. |
| 2009/0223091 | A1 | 9/2009 | Livingston et al. |

(Continued)

FOREIGN PATENT DOCUMENTS

| | | |
|---|---|---|
| CN | 113107043 A | 7/2021 |
| CN | 111511993 B | 6/2022 |

(Continued)

OTHER PUBLICATIONS

Great Britain Intellectual Property Office, "Patents Act 1977: Search Report under Section 17(5)", dated Mar. 4, 2025, from GB Application No. GB2415969.1, from Foreign Counterpart to U.S. Appl. No. 18/508,096, pp. 1 through 4, Published: GB.

(Continued)

*Primary Examiner* — Scott A Browne
*Assistant Examiner* — Izcalli Rios-Aguirre
(74) *Attorney, Agent, or Firm* — Fogg & Powers LLC

(57) ABSTRACT

Embodiments are directed to calibration of a blade and/or attachment member coupled to the body of a vehicle, such as a bulldozer. By analyzing attitude measurements of the blade and attachment member corresponding to directed movements of the vehicle, calibration parameters such as the offset angles of the blade (and attachment member) relative to the body can be determined. Other calibration variables, such as the maximum swing angles of the blade relative to the attachment member, can also be determined.

19 Claims, 10 Drawing Sheets

(56) References Cited

U.S. PATENT DOCUMENTS

| | | | |
|---|---|---|---|
| 2016/0028460 A1 | 1/2016 | Chen et al. | |
| 2016/0109270 A1* | 4/2016 | Zabegaev | G01P 21/00 |
| | | | 702/141 |
| 2016/0252909 A1 | 9/2016 | Webber et al. | |
| 2016/0319511 A1* | 11/2016 | Chang | E02F 3/844 |
| 2017/0114528 A1* | 4/2017 | Kosarev | E02F 9/265 |
| 2021/0293972 A1 | 9/2021 | Tamazato | |
| 2023/0129397 A1* | 4/2023 | Velde | E02F 3/3677 |
| | | | 701/50 |
| 2023/0203779 A1 | 6/2023 | Kamimae | |
| 2025/0154746 A1 | 5/2025 | Shen et al. | |

FOREIGN PATENT DOCUMENTS

| | | | |
|---|---|---|---|
| CN | 113047353 B | 9/2022 |
| CN | 217741776 U | 11/2022 |
| CN | 114396091 B | 12/2022 |
| EP | 2191291 B1 | 7/2014 |
| KR | 102479701 B1 | 12/2022 |

OTHER PUBLICATIONS

Great Britain Intellectual Property Office, "Patents Act 1977: Search Report under Section 17(5)", dated Mar. 24, 2025, from GB Application No. GB2416112.7, from Foreign Counterpart to U.S. Appl. No. 18/517,954, pp. 1 through 3, Published: GB.

Great Britain Intellectual Property Office, "Patents Act 1977: Search Report under Section 17(5)", dated May 7, 2025, from GB Application No. GB2415969.1, from Foreign Counterpart to US Application No. U.S. Appl. No. 18/508,096, pp. 1 through 4, Published: GB.

U.S. Patent and Trademark Office, "Office Action", U.S. Appl. No. 18/508,096, dated Dec. 23, 2025, pp. 1 through 30, Published: US.

U.S. Patent and Trademark Office, "Notice of Allowance", U.S. Appl. No. 18/508,096, dated Apr. 28, 2026, pp. 1 through 19, Published: US.

* cited by examiner

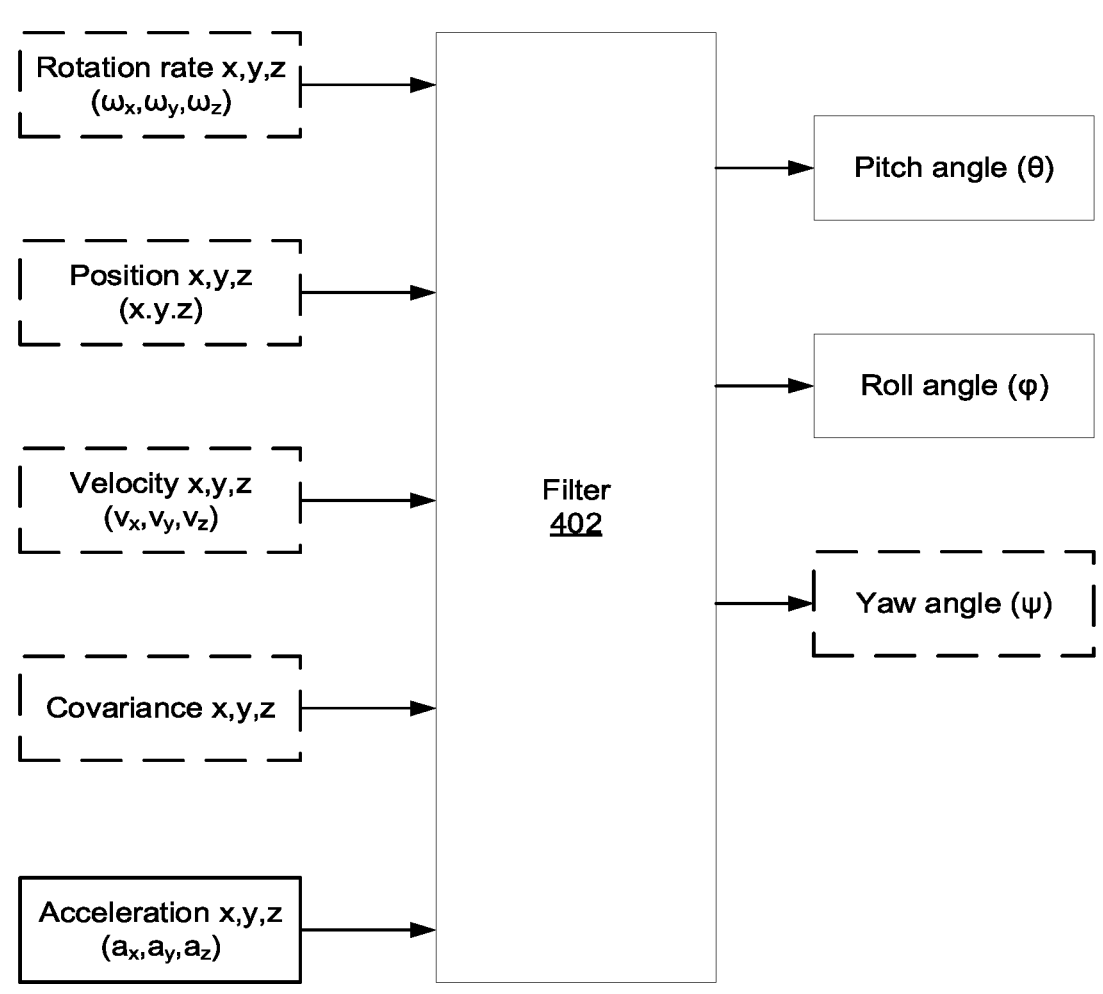
FIG. 4

600

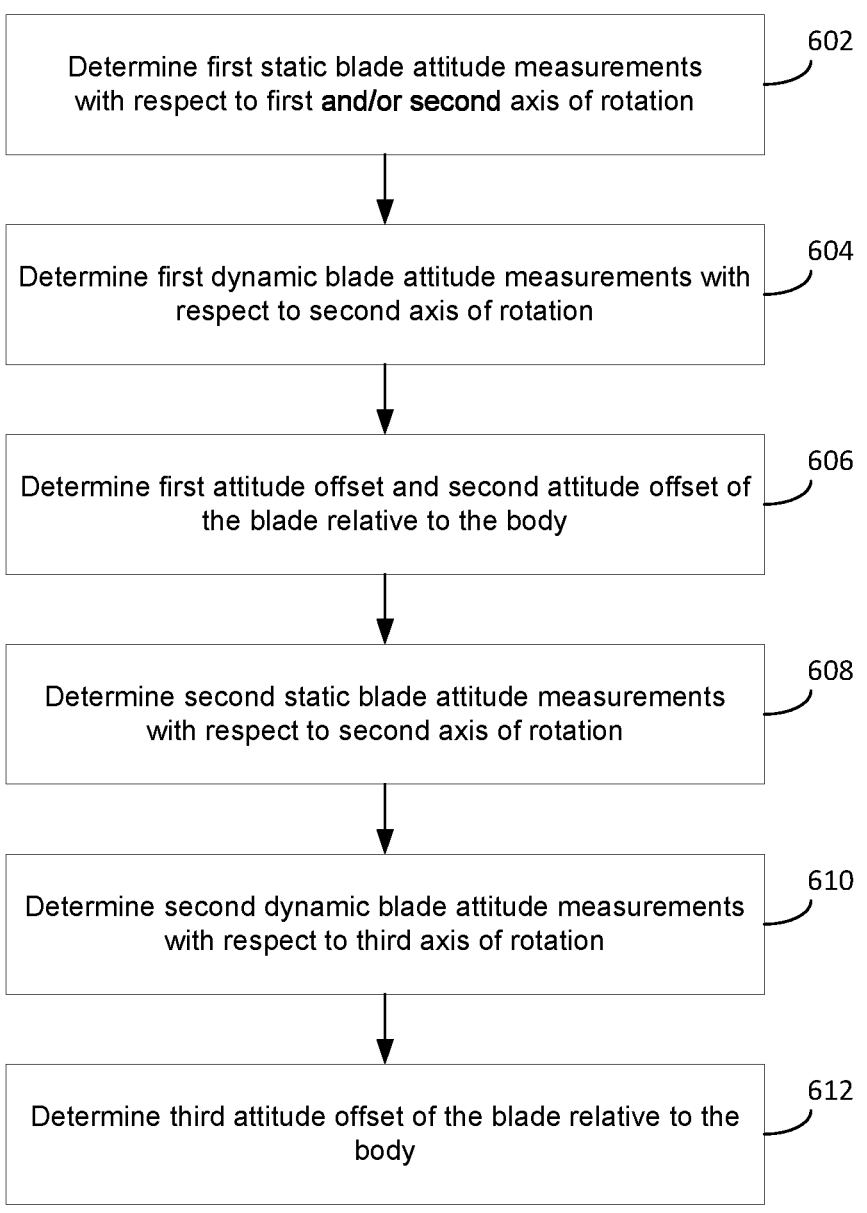

Determine first static blade attitude measurements with respect to first and/or second axis of rotation          602

Determine first dynamic blade attitude measurements with respect to second axis of rotation          604

Determine first attitude offset and second attitude offset of the blade relative to the body          606

Determine second static blade attitude measurements with respect to second axis of rotation          608

Determine second dynamic blade attitude measurements with respect to third axis of rotation          610

Determine third attitude offset of the blade relative to the body          612

FIG. 6

700
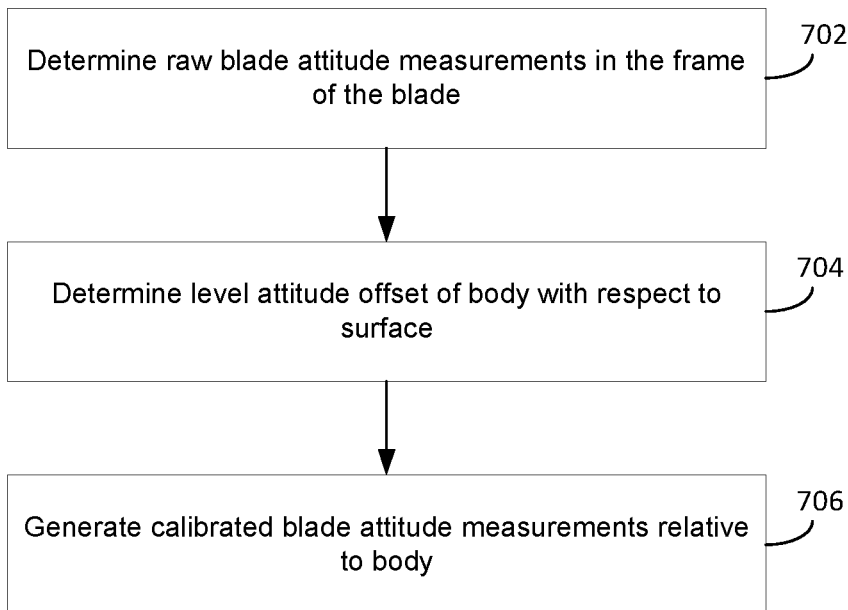
| Determine raw blade attitude measurements in the frame of the blade | 702 |
| Determine level attitude offset of body with respect to surface | 704 |
| Generate calibrated blade attitude measurements relative to body | 706 |
FIG. 7

800

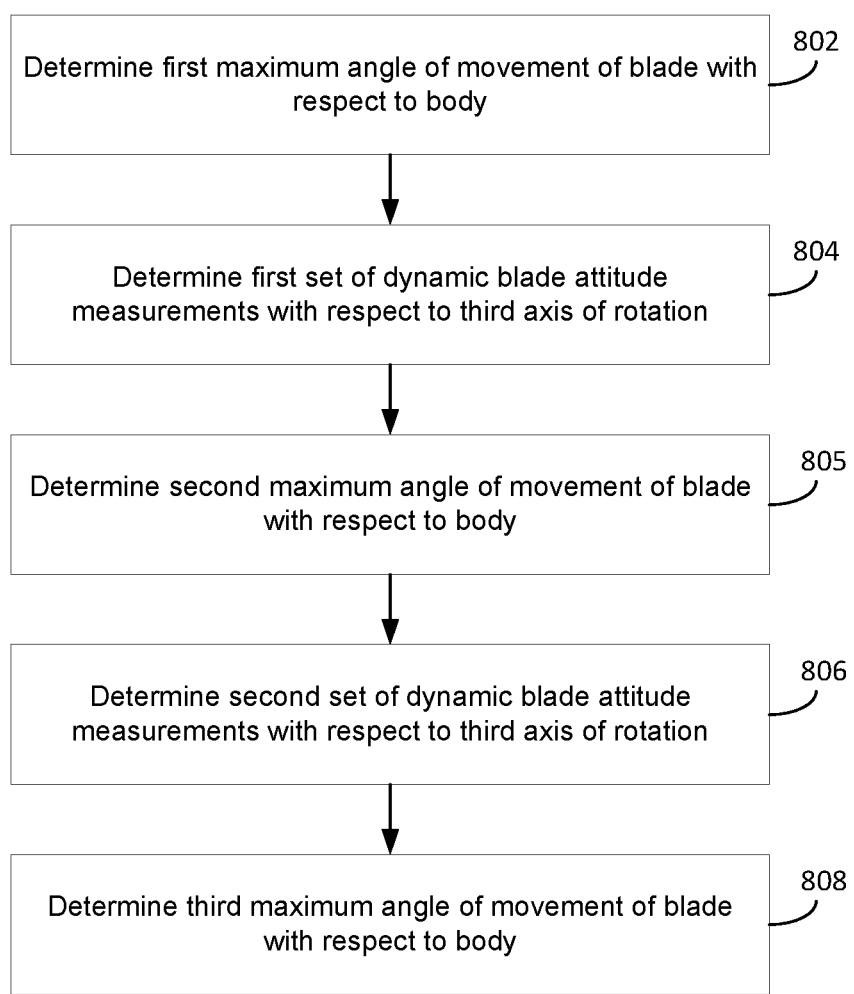

Determine first maximum angle of movement of blade with respect to body
802

Determine first set of dynamic blade attitude measurements with respect to third axis of rotation
804

Determine second maximum angle of movement of blade with respect to body
805

Determine second set of dynamic blade attitude measurements with respect to third axis of rotation
806

Determine third maximum angle of movement of blade with respect to body
808

902
Set blade into initial orientation

904
Hold blade in first position for first time period

906
Operate attachment member for lift movement

908
Hold blade in second position for second time period

910
Operate blade in first swing motion

912
Hold blade in third position

914
Operate blade in second swing motion

916
Hold blade in fourth position

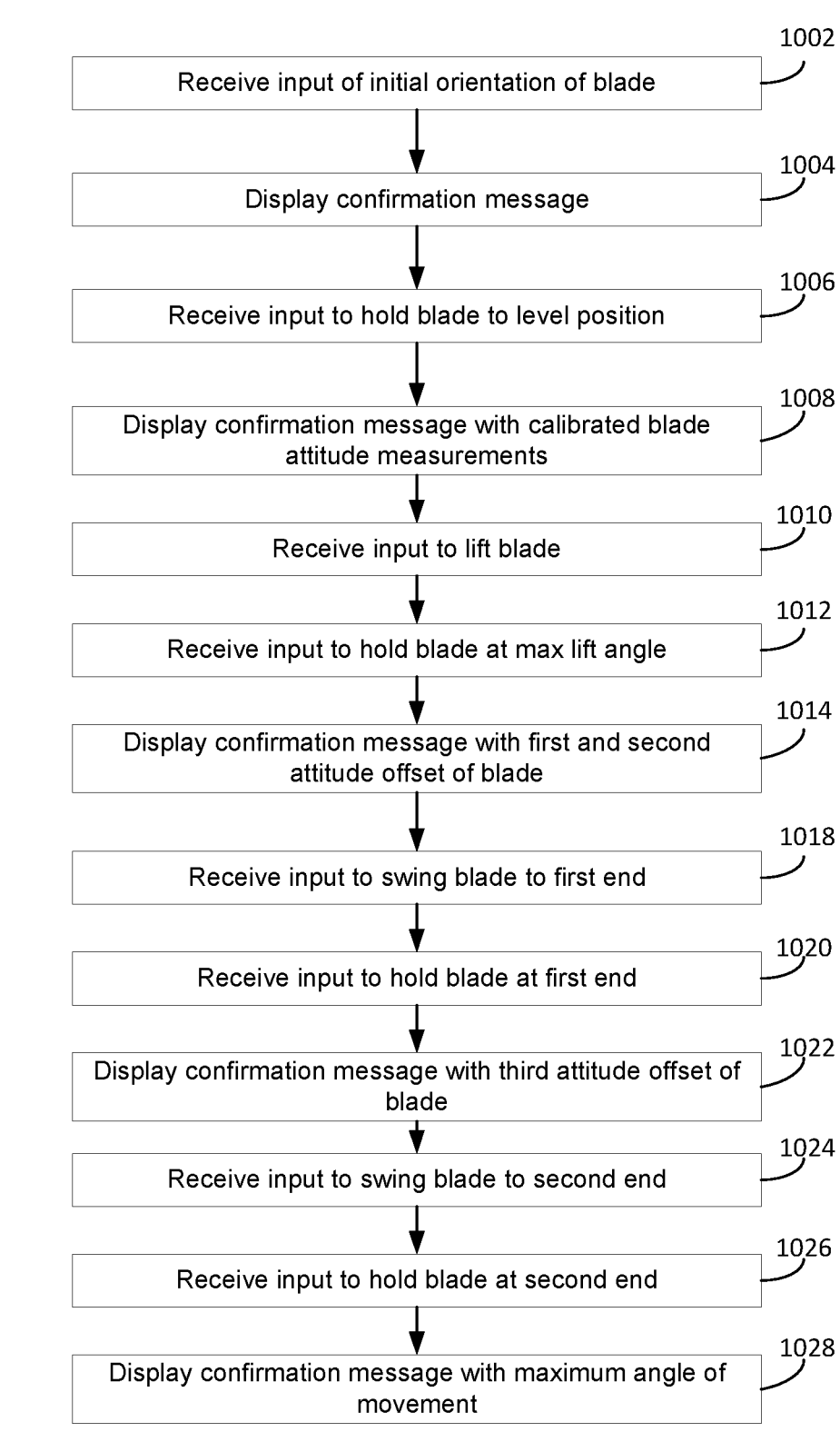

1000

1002
Receive input of initial orientation of blade

1004
Display confirmation message

1006
Receive input to hold blade to level position

1008
Display confirmation message with calibrated blade attitude measurements

1010
Receive input to lift blade

1012
Receive input to hold blade at max lift angle

1014
Display confirmation message with first and second attitude offset of blade 1018
Receive input to swing blade to first end 1020
Receive input to hold blade at first end 1022
Display confirmation message with third attitude offset of blade 1024
Receive input to swing blade to second end 1026
Receive input to hold blade at second end 1028
Display confirmation message with maximum angle of movement

FIG. 10

SENSOR INSTALLATION CALIBRATION FOR SIX-WAY BLADE MONITORING

BACKGROUND

Bulldozers are widely used in industrial applications such as in mining and construction. A bulldozer is typically constructed with three main components: a body, which serves as the main structure of the vehicle and which enables the operator to control the vehicle; a blade, which is configured for movement to gather and/or transport materials; and an attachment member (alternatively referred to as a "C-frame" or "lift arm") that controls the lifting position of the blade and couples the blade to the body. The vehicle body generally moves laterally against a surface in three-dimensions, the attachment member moves vertically with respect to the vehicle body, and the blade is configured for six-way movement with respect to the body. Movement of the bulldozer, and each component, can be characterized using rigid body kinematics and dynamics, in particular the three Euler angles pitch, roll, and yaw.

In many applications, it is important to know the configuration of the blade relative to the configuration of the vehicle body. During startup and initial operation, calibrating the configuration and movement of the blade is useful for subsequent blade movement and important for some applications, including for automated vehicle operation assistance.

SUMMARY

The details of one or more embodiments are set forth in the description below. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of the various patents, applications and publications as identified herein to provide yet further embodiments.

In one embodiment, a method for calibrating a blade attached to a vehicle is disclosed. The vehicle includes a body and an attachment member that couples the blade to the body, wherein movement of the blade is defined orthogonal to an axis of motion with respect to the attachment member. The attachment member is configured for lift movement, wherein the lift movement is defined as a rotation along a horizontal axis with respect to the body. The blade is configured for swing movement, wherein the swing movement is defined as a rotation along an axis orthogonal to an axis of the lift movement with respect to the attachment member. The method comprises determining first static blade attitude measurements of the blade for a first period of time in which the blade is held static relative to the attachment member. The first static blade attitude measurements are determined with respect to a first axis of rotation and a second axis of rotation of the blade. The first axis of rotation is defined parallel relative to a first axis of the body. The second axis of rotation is orthogonal to the first axis of rotation and defined parallel to a second axis of the body. The method comprises determining first dynamic blade attitude measurements of the blade with respect to movement of the blade about the second axis of rotation. The method comprises determining a first attitude offset of the blade and a second attitude offset of the blade relative to the body based on the first dynamic blade attitude measurements and the first static blade attitude measurements. The method comprises determining second static blade attitude measurements with respect to the second axis of rotation of the blade for a second period of time in which the blade is held static relative to the attachment member. The method comprises determining second dynamic blade attitude measurements of the blade with respect to movement of the blade about a third axis of rotation. The third axis of rotation is orthogonal to the first and second axis of rotation and defined parallel to a third axis of the body. The method comprises determining a third attitude offset of the blade relative to the body based on the second dynamic blade attitude measurements and the first static blade attitude measurements.

In another embodiment, a system is disclosed. The system is configured to be coupled on a vehicle. The vehicle includes a body, a blade, and an attachment member that couples the blade to the body, wherein movement of the blade is defined orthogonal to an axis of motion with respect to the attachment member. The attachment member is configured for lift movement, wherein the lift movement is defined as a rotation along a horizontal axis with respect to the body. The blade is configured for swing movement, wherein the swing movement is defined as a rotation along an axis orthogonal to an axis of the lift movement with respect to the attachment member. The system comprises at least one first sensor configured to be physically coupled to the blade. The at least one first sensor is configured to determine attitude measurements of the blade. The system comprises at least one second sensor configured to be physically coupled to the attachment member. The at least one second sensor is configured to determine attitude measurements of the attachment member. The system comprises at least one processor integrated in or coupled to the at least one first sensor and the at least one second sensor. The at least one first sensor is configured to determine first static blade attitude measurements with respect to a first axis of rotation of the blade for a first period of time in which the blade is held static relative to the attachment member. The first axis of rotation is defined parallel relative to a first axis of the body. The at least one first sensor is configured to determine first dynamic blade attitude measurements of the blade with respect to movement of the blade about a second axis of rotation, wherein the second axis of rotation is orthogonal to the first axis of rotation and defined parallel to a second axis of the body. The at least one first sensor is configured to determine second static blade attitude measurements with respect to the second axis of rotation of the blade for a second period of time in which the blade is held static relative to the attachment member. The at least one first sensor is configured to determine second dynamic blade attitude measurements of the blade with respect to movement of the blade about a third axis of rotation, wherein the third axis of rotation is orthogonal to the first and second axis of rotation and defined parallel to a third axis of the body. The at least one processor is configured to determine one or more calibration variables based on a combination of the attitude measurements from the at least one first sensor and the attitude measurements from the at least one second sensor. The at least one processor is configured to: determine a first attitude offset of the blade and a second attitude offset of the blade relative to the body based on the first dynamic blade attitude measurements and the first static blade attitude measurements, determine a third attitude offset of the blade relative to the body based on the second dynamic blade attitude measurements and the first static blade attitude measurements.

In yet another embodiment, a vehicle is disclosed. The vehicle comprises a body; a blade; and an attachment member coupled on an end of the body and which couples the blade to the body, wherein movement of the blade is defined orthogonal to an axis of motion with respect to the attachment member. The attachment member is configured for lift movement, wherein the lift movement is defined as a rotation along a horizontal axis with respect to the body. The blade is configured for swing movement, wherein the swing movement is defined as a rotation along an axis orthogonal to an axis of the lift movement with respect to the attachment member. The vehicle comprises at least one first sensor coupled to the blade. The at least one first sensor is configured to determine attitude measurements of the blade. The vehicle comprises at least one second sensor coupled to the attachment member. The at least one second sensor is configured to determine attitude measurements of the attachment member. The vehicle comprises at least one processor integrated in or coupled to the at least one first sensor and the at least one second sensor. The at least one first sensor is configured to determine first static blade attitude measurements with respect to a first axis of rotation of the blade for a first period of time in which the blade is held static relative to the attachment member, wherein the first axis of rotation is defined parallel relative to a first axis of the body. The at least one first sensor is configured to determine first dynamic blade attitude measurements of the blade with respect to movement of the blade about a second axis of rotation, wherein the second axis of rotation is orthogonal to the first axis of rotation and defined parallel to a second axis of the body. The at least one first sensor is configured to determine second static blade attitude measurements with respect to the second axis of rotation of the blade for a second period of time in which the blade is held static relative to the attachment member. The at least one first sensor is configured to determine second dynamic blade attitude measurements of the blade with respect to movement of the blade about a third axis of rotation, wherein the third axis of rotation is orthogonal to the first and second axis of rotation and defined parallel to a third axis of the body. The at least one processor is configured to determine one or more calibration variables based on a combination of the attitude measurements from the at least one first sensor and the attitude measurements from the at least one second sensor. The at least one processor is configured to determine a first attitude offset of the blade and a second attitude offset of the blade relative to the body based on the first dynamic blade attitude measurements and the first static blade attitude measurements. The at least one processor is configured to determine a third attitude offset of the blade relative to the body based on the second dynamic blade attitude measurements and the first static blade attitude measurements.

Additional embodiments are also disclosed, as subsequently described.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, as subsequently described and as described further in the detailed description.

FIG. 4 depicts a block diagram of processing logic configured to determine attitude measurements, as described in one or more embodiments.

FIG. 6 depicts a flow diagram of a method for calibrating a blade attached to a vehicle, as described in one or more embodiments.

FIG. 7 depicts a flow diagram of a method for calibrating raw blade attitude measurements, as described in one or more embodiments.

FIG. 8 depicts a flow diagram of a method for determining maximum angles of movement of a blade attached to a vehicle, as described in one or more embodiments.

FIG. 10 depicts a flow diagram of a method for processing calibration data, as described in one or more embodiments.

Figure 1:
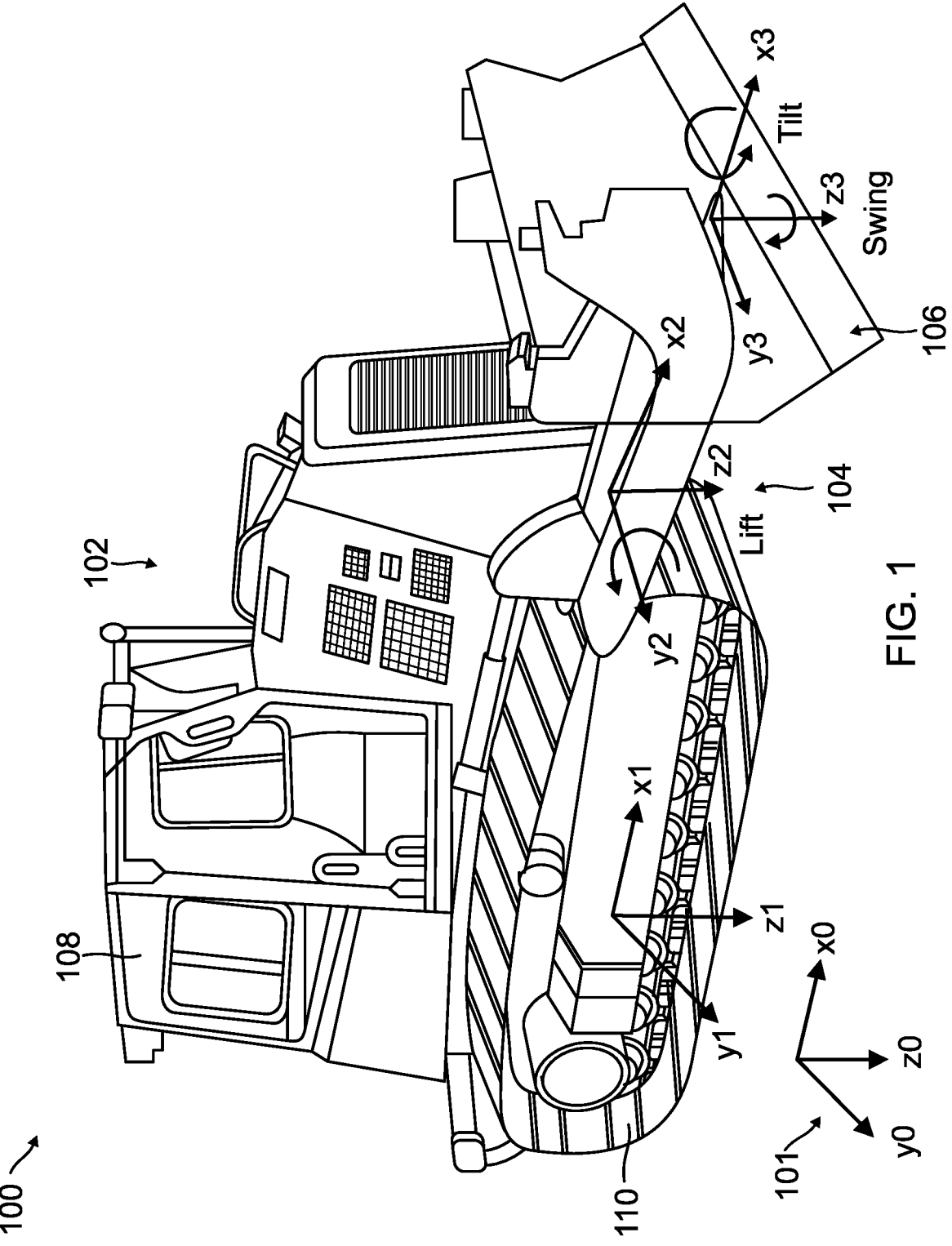
FIG. 1 depicts a block diagram of a vehicle in which the techniques described herein can be implemented, as described in one or more embodiments.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the methods presented in the drawing figures and the specification are not to be construed as limiting the order in which the individual steps may be performed. The following detailed description is, therefore, not to be taken in a limiting sense.

FIG. 1 depicts a vehicle 100 in which the techniques described herein can be implemented. Vehicle 100 is represented as a bulldozer for pedagogical explanation, understanding that the other vehicles may be used with similar configurations as described in FIG. 1. Vehicle 100 includes a body 102, a blade 106, and an attachment member 104. The vehicle body 102 is configured for three-dimensional movement with respect to a surface. For example, body 102 includes a rotor assembly 110 which enables vehicle 100 to move. Additionally, body 102 includes a chassis 108 that houses a control interface in which an operator can operate and control vehicle 100. In some embodiments, the operator can utilize a workstation device (see FIG. 3) that receives information from the sensors disposed on vehicle 100.

Figure 5:
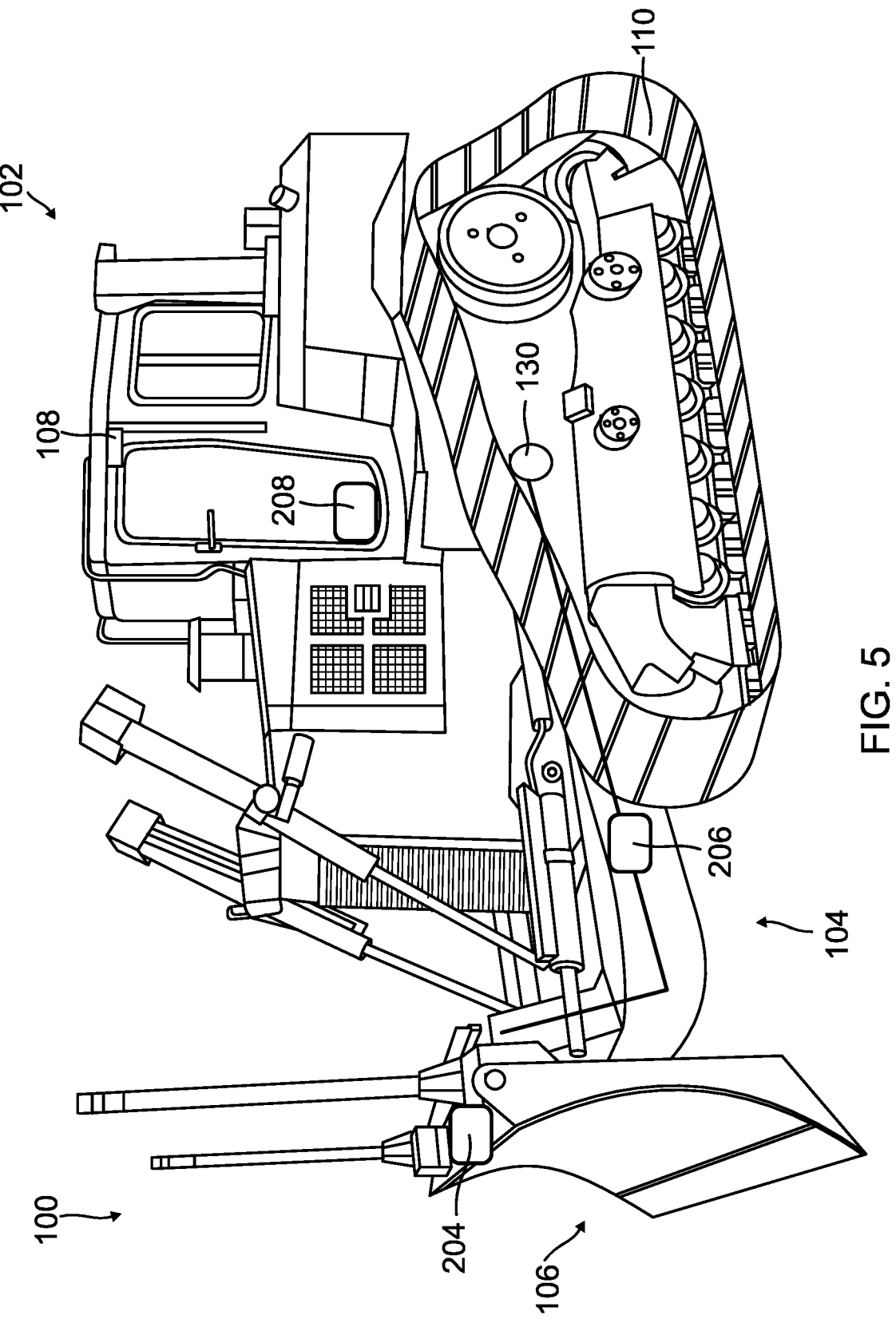
FIG. 5 depicts a block diagram of a vehicle with a plurality of sensors mounted on different portions of the vehicle, as described in one or more embodiments.

Attachment member 104 is suitably coupled to an end of vehicle body 102, for example, by mounting ankles 130 (see FIG. 5). Attachment member 104 can be referred to as a "C-frame" or "lift arm". Its movement is defined by one degree of freedom with respect to vehicle body 102. For example, referring to the three-dimensional Cartesian coordinate system in FIG. 1, attachment member 104 is configured for lift movement with respect to a rotation about the y2 axis. This enables attachment member 104 to move vertically up and down relative to body 102. Because attachment member 104 only has one degree of freedom, the attachment member 104 has no relative rotation about the x2 and z2 axes and only moves according to the lift movement about the y2 axis. The motion of attachment member 104

(and of the other components of vehicle 100 described herein) can be defined by other types of coordinate systems.

Movement of blade 106 is described with respect to its own coordinate system defined by the axes z3, x3, and y3 as shown in FIG. 1. In contrast with attachment member 104, blade 106 is allowed three degrees of movement for a total movement in six-directions relative to vehicle body 102. In this respect, blade 106 is sometimes referred to as a "six-way blade" 106. In FIG. 1, blade 106 is configured to rotate about the x3 axis. Such movement is referred to as "tilt movement" in which blade 106 "tilts" in which one side (left side, for example) of the blade 106 rotates up or down, with the opposite side (e.g., right side) tilting in the opposite direction in order control the bottom edge of the blade to an appropriate position. Additionally, blade 106 is configured to rotate about the z3 axis. This movement is referred to as "angle movement" or alternatively as "swing movement". When undergoing swing movement, blade 106 "swings" left or right relative to attachment member 104, visualized by one side (e.g., left side) of the blade 106 rotating forward or backward direction and the opposite side (e.g., right side) rotating in the opposite of the forward or backward direction. The lift movement of blade 106 is synchronized with the lift movement of attachment member 104, so that both attachment member 104 and blade 106 lift simultaneously in parallel.

A reference coordinate system 101 can be used to determine the orientation of the various components of vehicle 100. For example, reference coordinate system 101 can be defined in a frame relative to a surface or other external reference point relative to vehicle 100. As shown in FIG. 1, the reference coordinate system 101 is defined in three-dimensional Cartesian space to have axes x0, y0, z0.

Each of the rotations associated with attachment member 104 and blade 106 can be described in terms of rotation angles about the appropriate axis. For example, the orientation of attachment member 104 with respect to the y2 axis can be expressed as the lift angle, which changes as attachment member 104 moves about the y2 axis. The orientation of blade 106 with respect to the z3 axis can be expressed as the swing angle, which changes as blade 106 moves about the z3 axis. Additionally, the orientation of blade 106 with respect to the x3 axis can be expressed as the tilt angle, and likewise changes when the blade 106 tilts clockwise or counterclockwise. Each of these angles can be represented by a set of Euler angles with each Euler angle defined for a respective axis. The Euler angle characterizing the orientation with respect to the x axis (e.g., the x2, x3 axes) is the roll angle, the Euler angle characterizing the orientation with respect to the y axis (e.g., the y2, y3 axes) is the pitch angle, and the Euler angle characterizing the orientation with respect to the z axis (e.g., the z2, z3) axes is the yaw angle. Accordingly, the complete orientation of attachment member 104 and blade 106 in three-dimensional space can be captured by their respective configuration of roll, pitch, and yaw angles. In some embodiments, the orientation and movement of blade 106 is defined first by the lift angle, followed by the swing angle, and followed by the tilt angle. Some of these angles are difficult to capture during operation of vehicle 100. In particular, the swing angle of blade 106 is difficult to determine because it is defined independently of movement of attachment member 104 and body 102, and cannot be inferred from effects of gravity acting on the blade.

Figure 2:
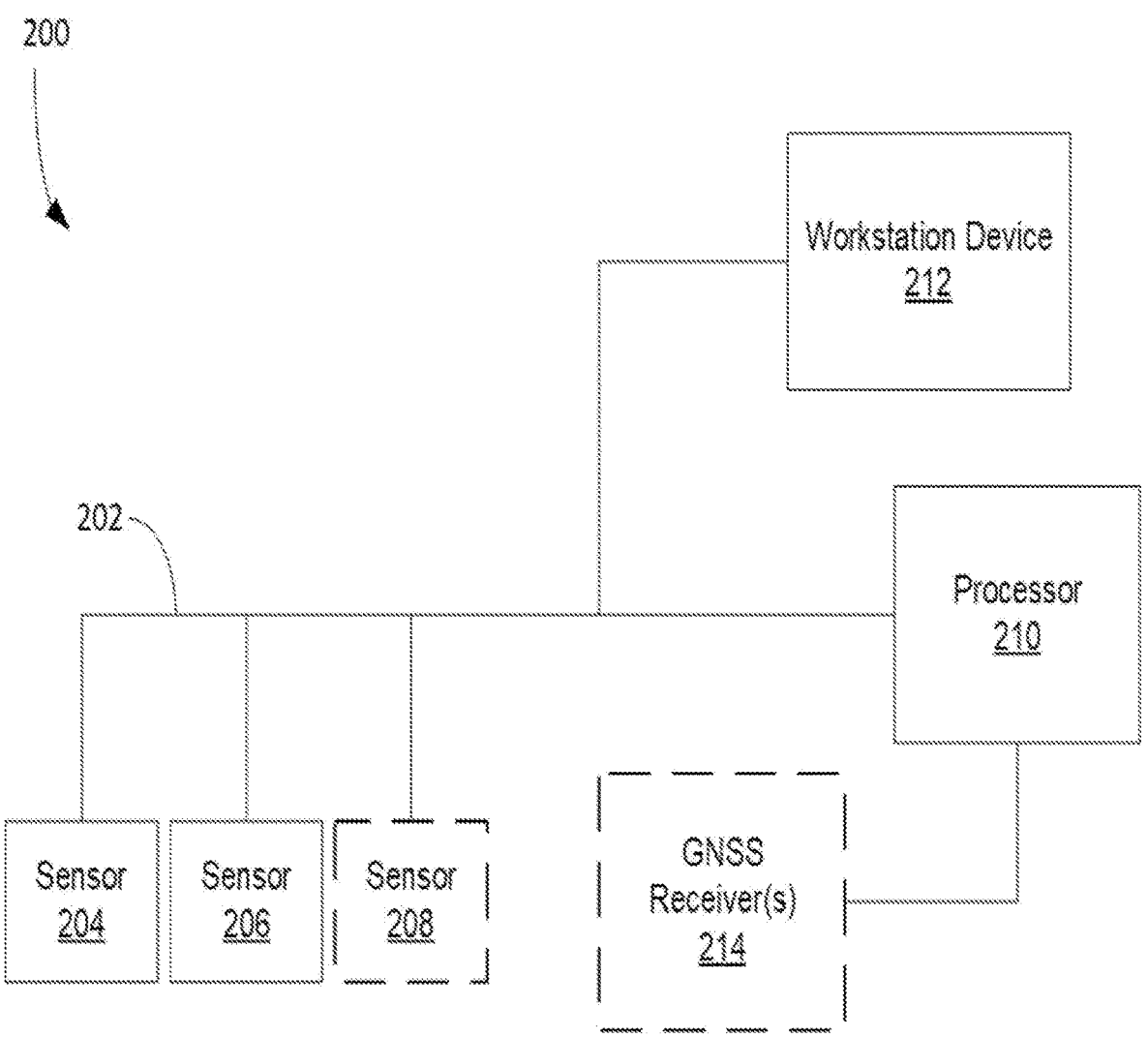
FIG. 2 depicts a block diagram of a motion sensing circuit mounted on a vehicle, as described in one or more embodiments.

FIG. 2 depicts a block diagram of a motion sensing circuit 200 mounted on a vehicle, such as vehicle 100 of FIG. 1. Motion sensing 200 includes a communication bus 202 that connects multiple devices together on vehicle 100. For example, the communication bus 202 can be a controller area network (CAN) bus, which can be implemented via electrical wiring or other communication media that connects devices mounted between different parts of vehicle 100.

Motion sensing circuit 200 further includes a plurality of sensors mounted on vehicle 100. A first sensor 204 is coupled to blade 106, for example, on the top of the blade. A second sensor 206 is coupled to attachment member 104 and configured to monitor movement with respect to the attachment member. And optionally, a third sensor 208 is coupled to a portion of vehicle body 102, such as inside the chassis 108. Each of these sensors are coupled to a workstation device 212. Workstation device 212 is an electronic device such as a laptop, smartphone, tablet, or other portable or onboard electronic device. In the case of a portable electronic device, workstation device 212 can be coupled to communication bus 202 via a wireless communication link. In the case of an electronic device mounted in the chassis, workstation device 212 can be coupled to communication bus 202 via one or more connecting ports.

Although FIG. 2 depicts a single sensor 204, sensor 206, and sensor 208, multiple sensors of each can be used. For example, multiple sensors 204 can be mounted on different parts of blade 106, multiple sensors 204 can be mounted on different parts of attachment member 104, and multiple sensors 208 can be mounted on different parts of body 102. In some embodiments, sensors 204, 206, 208 include an inertial measurement unit (IMU). Additionally, or alternatively, some of these sensors include at least one tri-axis accelerometer, and/or at least one tri-axis gyroscope.

Additionally, motion sensing circuit 200 includes at least one processor 210. Processor 210 can be integrated in at least one of the sensors 204, 206, 208, but can be implemented as a separate processing circuit as shown in FIG. 2. Processor 210 may include any one or combination of processors, microprocessors, digital signal processors, application specific integrated circuits, field programmable gate arrays, and/or other similar variants thereof. Processor 210 may also include, or function with, software programs, firmware, or other computer readable instructions for carrying out various process tasks, calculations, and control functions, used in the methods described below. These instructions are typically tangibly embodied on any storage media (or computer readable media) used for storage of computer readable instructions or data structures. Optionally, one or more Global Navigation Satellite Systems (GNSS) receivers 214 are coupled to various portions of vehicle 100. GNSS receiver 214 can determine three-dimensional position or heading information that can be used by processor 210 to supplement the motion and orientation of vehicle body 102 (as measured by optional sensor 208).

Figure 3:
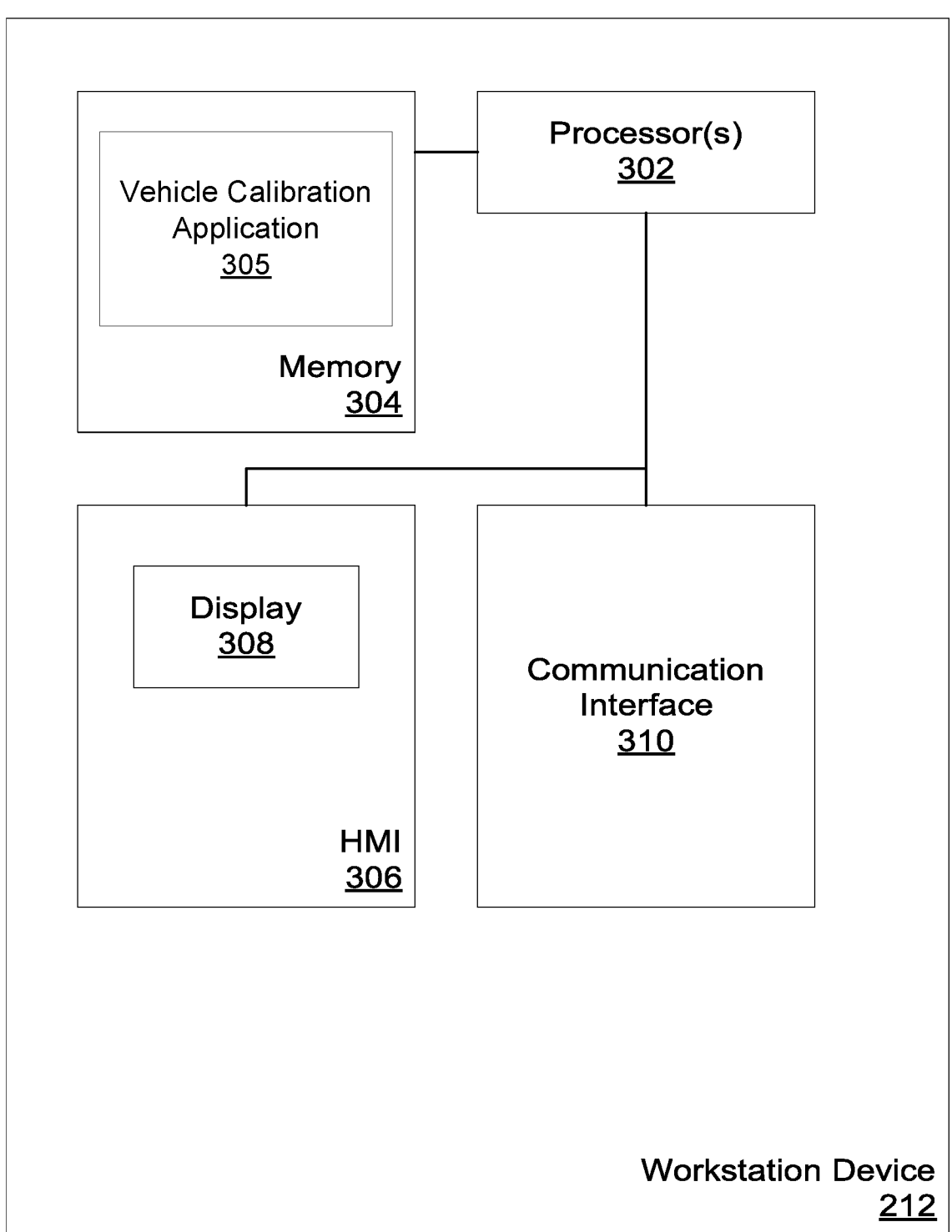
FIG. 3 depicts a block diagram of a workstation device, as described in one or more embodiments.

FIG. 3 depicts a block diagram of an exemplary workstation device 212 that can be used to interface with the sensors on vehicle 100. Workstation device 212 can be installed on vehicle 100, for example, on the control panel in chassis 108, or can be a portable electronic device that can be taken off vehicle 100. Workstation device 212 includes one or more processors 302 coupled to a human-machine interface (HMI) 306, a communication interface 310, and a memory 304. HMI 306 is configured to receive user input and to display information received or generated by workstation device 212 on one or more display screens 308. For example, display screen 308 can be a touchscreen that enables the vehicle operator to input data to workstation device 212 directly on the touchscreen. In some embodiments, HMI 306 includes button(s), keyboard(s), knob(s), switch(es), or other input devices that the vehicle operator may use in inputting data.

Memory 304 is configured to store a vehicle calibration application 305 that enables processor 302 to receive and process data from sensors 204, 206, and processor 210. For example, in executing the instructions of vehicle calibration application 305, processor 302 receives rotation rate and acceleration measurements of each of the sensors and the parameters of blade 106, such as the swing angle and the relative heading, and causes the parameters to be displayed on display 308 to the vehicle operator. As blade 106, attachment member 104, or body 102 undergoes movement, the data displayed on 308 changes in response to receiving updated parameters by motion sensing circuit 200. Vehicle calibration application 305 also enables HMI 306 to project an application interface on display 308 to guide the vehicle operator in calibrating blade 106 with attachment member 104 in connection with the calibration procedures further described herein. For example, vehicle calibration application 305 generates and displays commands on HMI 306 that direct the vehicle operator to move a component of vehicle 100, such as blade 106, in a specific way. Such calibration can be performed in a step-by-step process similar to a work order. In some embodiments, movement of the vehicle 100 may be done automatically without operator input. In these embodiments, vehicle calibration application 305 causes appropriate processing circuitry (e.g., processor 302), to issue vehicle commands to motor systems on vehicle 100 in conjunction with the calibration procedures described herein.

Data is received from motion sensing circuit 200 through communication interface 310. In the case of a portable workstation device 212, communication interface 310 includes a wireless interface such as a USB port that connects to a receiving port on communication bus 202. In other embodiments, communication interface 310 includes a wired interface such as electrical wiring that physically couples workstation device 212 to communication bus 202.

FIG. 4 depicts a block diagram of processing logic 400 configured to determine attitude measurements. Processing logic 400 can be implemented, for example, in any one or more of sensors 204, 206, 208. In some embodiments, processing logic 400 is implemented in processor 210 or processor 302 of workstation device 212. Each sensor 204, 206, 208 is configured to determine three-dimensional axis linear acceleration from e.g., an accelerometer integrated in each of the respective sensors. In some embodiments, the rotation rate is also measured with respect to a three-dimensional axis, in the case of an accelerometer, gyroscope, or combination thereof, disposed in at least one of sensors 204, 206, 208. Raw rotation rate measurements $\omega_x$, $\omega_y$, $\omega_z$ are optionally input and determined with respect to the frame of the component of vehicle 100 that the sensor is coupled to (e.g., a blade sensor 204 measures rotation rate with respect to blade 106).

Optionally, other inertial data is used to calculate the attitude measurements with respect to a component of vehicle 100. For example, processing logic 400 optionally uses position information in the x, y, and z coordinates. Such information can be acquired by the respective sensor 204, 206, 208, or can optionally be provided by GNSS receiver 214. Additionally, processing logic 400 optionally receives velocity measurements in the x, y, and z coordinates, along with the covariance information in the x, y, and z dimensions. Other inertial data can also be measured, depending on the sensor that is used.

Processing logic 400 combines each of the raw inertial measurements, including the acceleration and optional rotation rate, position, velocity, and covariance, into a filter 402. In some embodiments, filter 402 is a Kalman filter, complimentary filter, or other kind of processing filter that uses sensor fusion techniques to combine the raw inertial measurements. In some embodiments, data from other sensors can be combined by filter 402.

Filter 402 then outputs one or more attitude measurements of a component of vehicle 100 based on the raw inertial measurements. The attitude measurements are determined with respect to at least one Euler angle characterizing the orientation of the component being monitored. As shown in FIG. 4, processing logic 400 computes the pitch angle ($\theta$) and roll angle ($\varphi$) with respect to a reference frame of the component. In the case of coupling sensor 204 on blade 106, for example, processing logic 400 implemented in sensor 204 is configured to determine the pitch angle and roll angle of blade 106 in the reference frame of blade 106. Alternatively, if sensor 206 is coupled to attachment member 104, processing logic 400 implemented in sensor 206 is configured to output the pitch angle and roll angle of attachment member 104 in the reference frame of attachment member 104. Optionally, processing logic is configured to determine the yaw angle (W) of a component of vehicle 100. For example, if sensor 208 is coupled to vehicle body 102, then processing logic 400 implemented in sensor 208 is configured to determine the yaw angle (i.e. heading) of vehicle body 102 in the reference frame of the vehicle body 102. The pitch angle, roll angle, and yaw angle output from filter 402 can be used to determine the pitch offset, roll offset, and yaw offset of blade 106 with respect to vehicle body 102 during calibration and motion.

FIG. 5 depicts a block diagram of a vehicle 100 with a plurality of sensors mounted on different portions of the vehicle. Referring to FIGS. 2-3, first sensor 204 is mounted on top of blade 106, while second sensor 206 is mounted on a portion of attachment member 104. Optionally, a third sensor 208 is mounted in chassis 108 of vehicle body 102.

Since first sensor 204 is mounted on blade 106, first sensor 204 is configured to measure the attitude of blade 106 with respect to at least one of the Euler angles in the reference frame of blade 106. In some embodiments, first sensor 204 measures the pitch angle of blade 106 (the angle defined by the orientation of blade 106 with respect to the y3 axis) and the roll angle of blade 106 (defined by the orientation of blade 106 with respect to the x3 axis). Meanwhile, second sensor 206 is mounted on attachment member 104 and is configured to measure the attitude of attachment member 104 with respect to at least one of the Euler angles in the reference frame of attachment member 104. For example, second sensor 206 measures the pitch angle of attachment member 104 (defined by the orientation of attachment member 104 with respect to the y2 axis) and the roll angle r2 of attachment member 104 (defined by the orientation of attachment member 104 with respect to the x2 axis). These attitude measurements are then provided to processor 210 for analysis, e.g., for determination of the attitude offsets of blade 106 with respect to the body 102, maximum angles of movement, and other calibration variables.

FIG. 6 depicts a flow diagram of an exemplary method 600 for calibrating a blade attached to a vehicle. Method 600, along with any of the methods further described, may be implemented via the techniques described with respect to FIGS. 1-5, but may be implemented via other techniques as well. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

Method 600 includes determining first static blade attitude measurements with respect to a first and/or second axis of rotation at block 602. As used herein, the term "static" blade attitude measurements refers to attitude measurements of the blade when it is in physical equilibrium, such as when blade 106 is held fixed by the operator or mechanical system on vehicle 100. In some embodiments, attitude measurements include the pitch angle, roll angle, and/or yaw angle of the blade as measured by blade sensor 204. For pedagogical explanation, the first axis of rotation is described as a rotation about the x-axis, or the axis defined parallel to the horizontal plane of the vehicle, pointing to the forward direction of the vehicle. For example, when attitude measurements are determined with respect to both the first axis of rotation (x-axis) and the second axis of rotation (y-axis), the attitude measurements can include the roll and pitch of the blade 106.

Method 600 proceeds to block 604 and determines first dynamic blade attitude measurements of the blade about a second axis of rotation. As used herein, the term "dynamic" blade attitude measurements refers to attitude measurements of the blade when the blade undergoes movement. In some embodiments, the dynamic blade attitude measurements include the Euler angle and rotation rate of blade 106 with respect to an axis of rotation. For pedagogical explanation, the second axis of rotation is the y-axis, or the axis orthogonal to the vertical and horizontal axes in a two-dimensional plane occupied by vehicle 100, pointing to the right direction of the vehicle. This corresponds to lifting movement of blade 106 in the vertical direction relative to body 102, facilitated by the vertical movement of attachment member 104. In this implementation, the first dynamic blade attitude measurements include the rotation rate of blade 106 relative to the y-axis, otherwise represented by the parameter $\omega_y$.

Proceeding next to block 606, method 600 determines a first attitude offset of the blade relative to the body. The first attitude offset of blade 106 is determined based on the first static blade attitude measurements determined at block 602 and the first dynamic blade attitude measurements determined at block 604. Referring to the example at block 602, method 600 in some embodiments determines the first attitude offset of blade 106 using the pitch and roll of blade 106 with respect to the x-axis and y-axis. In this example, the first attitude offset is the roll offset of blade 106 with respect to vehicle body 102. As further described with respect to FIG. 7, the blade attitude measurements are generally calibrated to compensate for the level offset caused by the geometry of the surface relative to vehicle 100.

Additionally, method 600 determines at block 606 a second attitude offset of the blade relative to the body based on the first static and first dynamic blade attitude measurements. In the preceding examples, while the first attitude offset is the roll offset of blade 106 relative to the body 102, the second attitude offset is the yaw offset of blade 106 relative to body 102. In these examples, the static blade attitude measurements are used to determine a reference orientation of blade 106, while the dynamic blade attitude measurements correspond to the rotation rate about the y2/y3 axes. The first and second attitude offsets with respect to vehicle body 102 are determined from these quantities.

A similar process can also be performed to calibrate the attachment member 104. As previously noted, the attachment member 104 couples the blade 106 to the body 102, and both the blade 106 and attachment member 104 undergo lift movement simultaneously. Accordingly, a first and second offset of the attachment member 104 (e.g., the roll and yaw offset) can be determined from static and dynamic attitude measurements taken from second sensor 206 simultaneously with the first static blade attitude measurements and the first dynamic blade attitude measurements when the blade 106 and attachment member 104 undergo synchronous lift movement about the y-axis.

One example of determining the roll offset and the yaw offset of blade 106 is described as follows. In an exemplary calibration test, the operator is requested to position the vehicle in a relative level surface as per the calibration guidance criteria (see FIG. 9) to initialize the calibration process. When attachment member 104 and blade 106 undergo pure lift movement, the x and z components of the rotation rate can be approximated as zero, thereby generating the approximation that the norm of the rotation rate is equivalent to its magnitude of its y-component rotation, that is, $\omega=\omega_y$. In general, the inertial measurements determined by sensors 204 on the blade can be represented by the following equations:

$$\text{Eqn. 1(a)}$$

$$g_x = [\cos(\Delta\psi_b) * \sin(\Delta\theta_s + \Delta\theta_b) * \sin(\Delta\varphi_b) - \sin(\Delta\psi_b) * \cos(\Delta\varphi_b)] * \omega_y$$

$$\text{Eqn. 1(b)}$$

$$g_y = [\sin(\Delta\psi_b) * \sin(\Delta\theta_s + \Delta\theta_b) * \sin(\Delta\varphi_b) + \cos(\Delta\psi_b) * \cos(\Delta\varphi_b)] * \omega_y$$

$$g_z = [\cos(\Delta\theta_s + \Delta\theta_b) * \sin(\Delta\varphi_b)] * \omega_y \qquad \text{Eqn. 1(c)}$$

where $g_x$, $g_y$, $g_z$ are the components of the rotation rate measurements determined by blade sensor 204 in the x, y, z directions, respectively, $\Delta\varphi_s$ is the roll offset of blade 106 relative to the surface, $\Delta\psi_b$ is the yaw offset of blade 106 (and equivalently attachment member 104) relative to body 102, whose frame is defined as 3 orthogonal rotation axes (tilt, lift, swing axes). $\Delta\theta_s+\Delta\theta_b$ is the roll offset of blade 106, and $\omega$ is the magnitude (norm) of the rotation rate. Specifically, the quantity $\Delta\theta_s$ represents the level offset of body 102 with respect to the surface, as subsequently described with respect to FIG. 7, while the quantity $\Delta\theta_b$ represents the offset of blade 106 with respect to vehicle body 102 (assuming a level surface). In these equations, blade sensor 204 measurements $g_x$, $g_y$, $g_z$ and $\omega$ are known or inferred, after the first static period, $\Delta\theta_s$ and $\Delta\varphi_b$ are known, while the yaw offset $\Delta\psi_b$ and roll offset $\Delta\theta_b$ are to be determined.

In some embodiments, additional approximations can be made to Equations 1(a)-(c) based on the geometry and dynamics of the blade calibration motion. For example, when undergoing motion to generate the first dynamic blade attitude measurements, the installation angle offset ($\Delta\varphi_b$, $\Delta\theta_b$, and $\Delta\psi_b$) can be assumed as small (on the order of a few degrees or less). From the small angle approximation as applied to these quantities, Equations 1(a)-(c) can be reduced as follows:

$$g_x = -\sin(\Delta\psi_b) * \omega_y \qquad \text{Eqn. 2(a)}$$

-continued $$g_y = [\cos(\Delta\psi_b) * \cos(\Delta\varphi_b)] * \omega_y \qquad \text{Eqn. 2(b)}$$

$$g_z = [\cos(\Delta\theta_s + \Delta\theta_b) * \sin(\Delta\varphi_b)] * \omega_y \qquad \text{Eqn. 2(c)}$$

Accordingly, Equation 2(a) can be used to determine the yaw offset $\Delta\psi_b$, while Equation 2(c) can be used to determine the roll offset $\Delta\varphi_b$, for example, in terms of the pitch offset $\Delta\theta_s + \Delta\theta_b$ The yaw and roll offset represent examples of the first and second attitude offset of the blade determined at block 610.

Proceeding to block 610, method 600 determines second static blade attitude measurements with respect to the second axis of rotation. Like the first static blade attitude measurements, the second blade attitude measurements are determined when blade 106 is static and not moving in three-dimensional space. In the preceding example, the second axis is the y-axis. Hence, in this example, blade 106 is held static after completing the lift motion about the y-axis while blade sensor 204 acquires attitude measurements (e.g., at the point of maximum lift). In some embodiments, the second static blade attitude measurements initially measured in the frame of blade 106 are then rotated to the frame of vehicle body 102, as further described with respect to FIG. 7.

Method 600 then determines second dynamic blade attitude measurements about a third axis of rotation at block 610. Similar to the first dynamic blade attitude measurements, the second dynamic blade attitude measurements are determined from movement of blade 106 about the third axis of rotation. In the preceding example, the third axis of rotation is the z-axis, or the axis defined vertically with respect to vehicle body 102, so that blade 106 undergoes swinging movement from left to right (or vise-versa) relative to vehicle body 102. In some embodiments, the second dynamic blade attitude measurements include the rotation rate of blade 106 as measured by blade sensor 204 in each of the x, y, and z directions. These second dynamic blade attitude measurements include the rotation rate about the z-axis of motion.

At block 612, method 600 proceeds by determining a third attitude offset of the blade relative to the third axis of rotation. In the preceding example, the at least one third attitude offset comprises the pitch offset of blade 106 relative to the z-axis based on the swinging motion of blade 106. The third attitude offset is determined based on the second dynamic blade attitude measurements. Additionally, because the blade 106 undergoes pure swinging motion about the third axis of rotation, the norm of the rotation rate is equivalent to its magnitude of rotation about the z-axis, that is, $\omega=\omega_z$. For example, the pitch offset of the blade follows from the following equations:

$$g_x = [\cos(\Delta\psi_b) * \sin(\Delta\theta_s + \Delta\theta_b) * \cos(\Delta\varphi_b) + \sin(\Delta\psi_b) * \sin(\Delta\varphi_b)] * \omega_z \qquad \text{Eqn. 3(a)}$$

$$g_y = [\sin(\Delta\psi_b) * \sin(\Delta\theta_s + \Delta\theta_b) * \cos(\Delta\varphi_b) - \cos(\Delta\psi_b) * \sin(\Delta\varphi_b)] * \omega_z \qquad \text{Eqn. 3(b)}$$

$$g_z = [\cos(\Delta\theta_s + \Delta\theta_b) * \cos(\Delta\varphi_b)] * \omega_z \qquad \text{Eqn. 3(c)}$$

in which the roll offset $\Delta\varphi_b$ and yaw offset $\Delta\psi_b$ are previously determined from Equations 2(a)-(c) with respect to block 610. Using the same small angle constraints as previously described, Equations 3(a)-(c) can be reduced to:

$$g_x = [\cos(\Delta\psi_b) * \sin(\Delta\theta_s + \Delta\theta_b) * \cos(\Delta\varphi_b)] * \omega_z \qquad \text{Eqn. 4(a)}$$

$$g_y = [-\cos(\Delta\psi_b) * \sin(\Delta\varphi_b)] * \omega_z \qquad \text{Eqn. 4(b)}$$

$$g_z = [\cos(\Delta\theta_s + \Delta\theta_b) * \cos(\Delta\varphi_b)] * \omega_z \qquad \text{Eqn. 4(c)}$$

The pitch offset $(\Delta\theta_s + \Delta\theta_b)$ can then be determined, for example, from Equation 4(a). As $\Delta\theta_s$ is known per the first static level surface calibration (i.e., from the first static blade attitude measurements), the offset of blade 106 with respect to vehicle body 102 $\Delta\theta_b$ can be calculated and compensated. Utilizing the calibration procedure described with respect to FIG. 6 enables the three attitude offsets (pitch, roll, yaw) of blade 106 to be determined with respect to body 102, using purely inertial sensors without the use of position information supplied by a GNSS antenna or other non-inertial source. This calibration procedure can be performed to calibrate vehicle 100 before continuous use. Additionally, the calibration procedure described with respect to FIG. 6 can be modified or expanded to determine other calibration variables, as described as follows.

Notably, Equations 1-2(c) can be modified when calibrating the offset angles of the attachment member 104, by replacing the quantities $\Delta\varphi_b$, $\Delta\theta_b$, and $\Delta\psi_b$ with the quantities $\Delta\varphi_c$, $\Delta\theta_c$, and $\Delta\psi_c$ representing the roll, pitch $(\Delta\theta_s + \Delta\theta_c)$, and yaw offset of the attachment member 104, respectively.

FIG. 7 depicts a flow diagram of a method 700 for calibrating raw blade attitude measurements, such as the static and dynamic attitude measurements obtained by one or more blade sensors 204 as described with respect to FIG. 6. Such calibrated attitude measurements can be subsequently used for the determination of various calibration variables during a calibration process, such as one or more attitude offsets of blade 106 with respect to body 102, the swing angle of blade 106, and one or more maximum angles of movement of blade 106.

Method 700 includes determining raw blade attitude measurements in the frame of the blade at block 702. These raw blade attitude measurements include the raw pitch, roll, and yaw angles of the blade measured by one or more blade sensors 204. When the blade is static relative to body 102, the raw blade attitude measurements are raw static blade attitude measurements. When the blade undergoes motion, the raw blade attitude measurements are raw dynamic blade attitude measurements acquired during motion of the blade 106. In some embodiments, the raw blade attitude measurements are determined relative to the surface below vehicle 100.

Proceeding to block 704, method 700 determines a level attitude offset of the vehicle body with respect to the surface. In some implementations, vehicle body 102 rests on a perfectly or substantially flat surface such that there is no level offset between the horizontal plane of the vehicle body 102 and the surface. But, sometimes vehicle body 102 may not be traversing a flat surface. There may be a level offset between the horizontal plane of vehicle body 102 and the surface, which can impact the calibration of the blade relative to body 102. In some embodiments, the level attitude offset of vehicle body 102 is determined from one or more sensors 208 coupled to the vehicle body 102. Additionally, or alternatively, the level attitude offset can be assumed as a constant small angle offset from the horizontal plane of body 102, since vehicle body 102 remains stationary with respect to the surface during calibration of the blade 106.

At block 706, method 700 generates calibrated attitude measurements of the blade relative to the vehicle body based on the raw blade attitude measurements and the level attitude offset. The calibrated attitude measurements compensate for the determined level offset for a non-flat surface. For example, the raw static blade attitude measurements can be rotated based on the level attitude offset to determine the calibrated attitude measurements in the frame of vehicle body 102. In doing so, the configuration of blade 106 and the parameters of which to calibrate the blade during operation can be compensated by any offset bias attributed to a non-level surface.

In some embodiments, method 700 utilizes a conversion matrix to directly rotate the raw blade attitude measurements to the frame of vehicle body 102. Assuming the attitude measurements are represented in matrix form, there are normally two rotations needed to convert the attitude of the blade from the frame of the blade to an attitude of the blade as reflected in the frame of vehicle body 102. The first rotation matrix represents the raw attitude measurements of the blade 106 with respect to the level attitude offset determined from the surface. The second rotation matrix then represents the rotation from the level attitude offset to the frame of the body 102. By defining a conversion matrix as the multiplication of the first and second rotation matrices, the raw blade attitude measurements can be converted directly into the frame of vehicle body 102 with one rotation. The conversion orientation angles generated from the conversion matrix can be stored in memory and used by the processing system processing measurements acquired during calibration to simplify the computational analysis and expedite the calibration process.

Notably, the calibration of the attitude measurements of the attachment member 104 can be performed in a similar manner as described by method 700 for the blade 106.

FIG. 8 depicts a flow diagram of a method 800 for determining maximum angles of movement of a blade attached to a vehicle. Method 800 can be performed in combination with the functionality described with respect to methods 600-700. For example, in performing a calibration procedure to calibrate blade 106, the maximum angles of movement as described in method 800 can also be determined in parallel with the attitude offsets of the blade 106 described in method 600.

Method 800 includes determining a first maximum angle of movement of the blade with respect to the vehicle body at block 802. In one example, the first maximum angle of movement is the maximum lift angle that corresponds to the lifting motion of blade 106 about the y-axis. Referring to method 600, in some embodiments, the maximum lift angle is determined based on the second static blade attitude measurements and the first dynamic blade attitude measurements. As described with respect to FIG. 6, blade 106 starts from an initial orientation at the bottom near the surface, and continues to lift upwards in the y-direction until the maximum point that is supported by attachment member 104. During this movement period, the blade sensor 204 is also determining rotation rate measurements (the first dynamic blade attitude measurements). By comparing the attitude of blade 106 when it first begins the lifting movement and the attitude at the point of maximum lift at which blade 106 completes the lifting movement, the maximum lift angle of blade 106 can be determined, and converted into the frame of vehicle body 102 as described with respect to FIG. 7.

Proceeding to block 804, method 800 determines a first set of dynamic blade attitude measurements with respect to the third axis of rotation. For pedagogical explanation, the third axis of rotation is described as the z-axis, so that the second dynamic blade attitude measurements correspond to swing movement of blade 106. At this stage of method 800, the second dynamic blade attitude measurements comprise a first set and a second set of measurements. The first set of measurements, determined at block 804, arise from the movement of blade 106 with respect to one direction of swing movement, for example, from swinging the blade 106 to the left with respect to vehicle body 102 from a first point to an end point of the left swinging motion.

At block 805, method 800 determines a second maximum angle of movement of the blade with respect to the body. In some embodiments, method 800 determines the maximum swing angle with respect to the swing movement in the left direction after performing the swinging motion to the left at block 804. However, the second maximum angle of movement can also be the maximum right swing angle of the blade relative to the body.

Next, after one direction of the swing movement is completed, method 800 proceeds to block 806 and determines a second set of dynamic blade attitude measurements with respect to the third axis of rotation. Following the example described with respect to block 804, in block 806 the second set of dynamic measurements correspond to swing movement of blade 106 from the left to the right to an end point of the right swinging motion, relative to vehicle body 102.

At block 808, method 800 determines a third maximum angle of movement of blade with respect to the attitude of the attachment member. In the preceding example, the third maximum angle of movement corresponds to the maximum right swing angle of blade 106 with respect to rotation about the z axis. The maximum left and right swing angles are determined based on the set of dynamic blade attitude measurements that correspond to the movement in the respective direction. For example, the second (left) maximum angle of movement is determined based on the first set of dynamic blade attitude measurements when the blade 106 swings in the left direction until it reaches the end of the left swinging motion, while the third (right) maximum angle of movement is determined based on the second set of dynamic blade attitude measurements when the blade 106 swings in the right direction until it reaches the end of the right swinging motion.

While method 800 focuses on determining maximum angles of movement with respect to the blade, the determination of these maximum angles of movement can be made in conjunction with the attitude offsets of blade 106 as part of a comprehensive and integrated blade calibration procedure.

Figure 9:
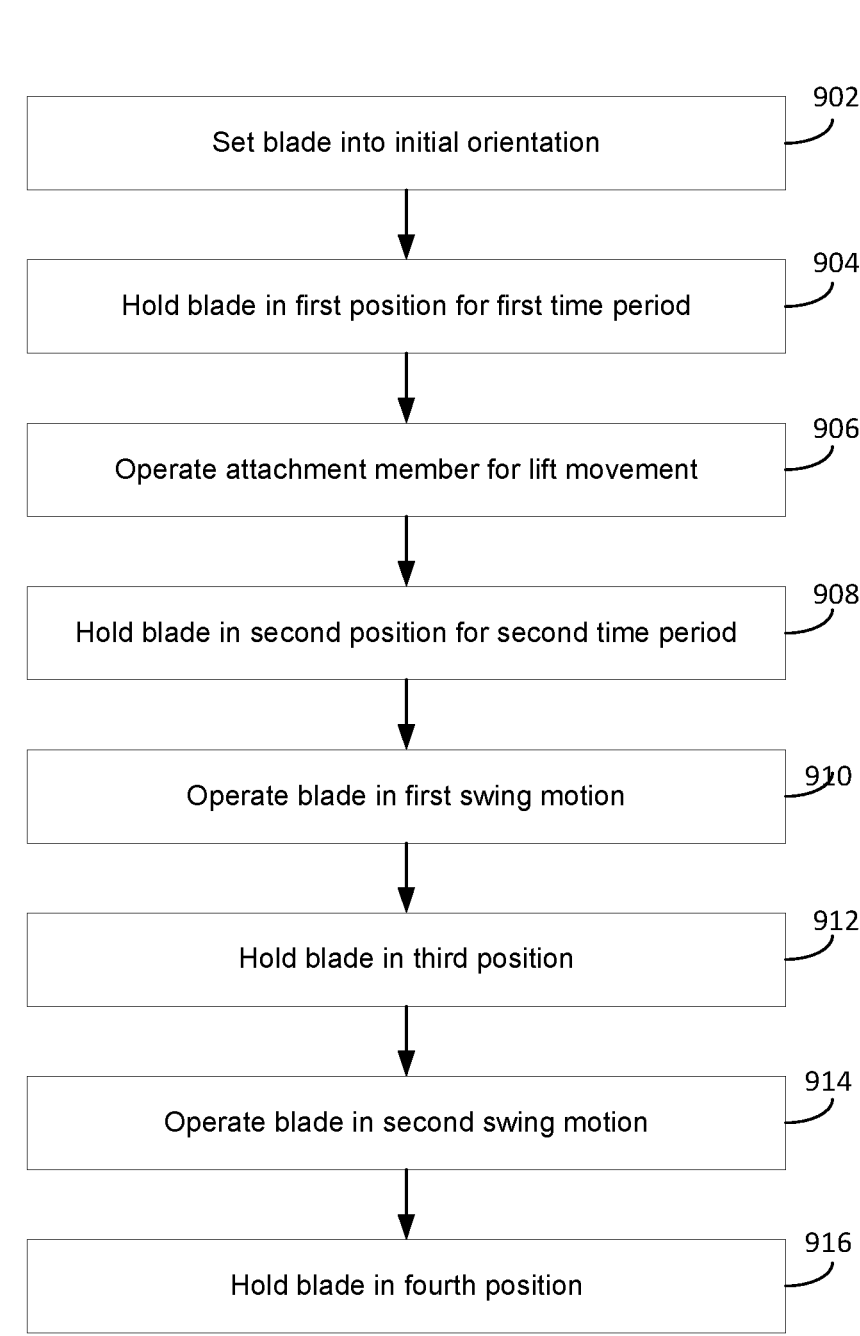
FIG. 9 depicts a flow diagram of a method for operating a blade during calibration, as described in one or more embodiments.

FIG. 9 depicts a flow diagram of a method 900 for operating a blade during calibration. Method 900 can be implemented in conjunction with the techniques described in methods 600-800 and based on the description with respect to FIGS. 1-5. In some embodiments, method 900 is performed by an operator located in the chassis 108 of vehicle 100, in which the operator operates the vehicle 100 as part of a calibration procedure before continuous and systematic vehicle operation. In some embodiments, some of the functionality described with respect to method 900 can be implemented by appropriate control circuitry to operate the vehicle 100, for example, via fully automated driving logic or facilitated driving assistance logic.

Method 900 includes setting the blade into an initial orientation at block 902. When executing a calibration procedure, the blade 106 can be set into an initial orientation based on one or more calibration guidance criterion. For example, when vehicle 100 is resting on a level surface, the initial orientation of blade 106 can be one that minimizes the bias or noise of the blade sensors 204. The calibration guidance criterion can also include the approximation constraints described with respect to Equations 1(a)-4(c), by orienting the blade 106 to have a small pitch or roll orientation. When the surface is not level, the attitude measurements of blade 106 (and in some embodiments attachment member 104) are rotated from the frame of blade 106 (and/or attachment member 104) to the frame of vehicle body 102, as described with respect to FIG. 7.

At block 904, method 900 holds the blade in a first position for a first time period. This function corresponds to the determination of first static blade attitude measurements described with respect to block 602 of method 600. Once blade 106 is held static in the first position, blade sensor 204 measures the pitch, roll, and yaw of the blade for the duration of the first time period. In some embodiments, the first position corresponds to the position of lowest height of blade 106 relative to the surface so that the blade is touching or nearly touching the surface. The first time period can be any fixed period of time in which to obtain the first static blade attitude measurements. For example, the first time period can be approximately 10 seconds.

Method 900 then proceeds to block 906 and operates the attachment member for lift movement. Here, attachment member 104 lifts from the first position and increases in height, along with blade 106. During the lift movement performed at block 906, blade sensor 204 determines the first dynamic blade attitude measurements described with respect to block 608 of method 600 as blade 106 moves with attachment member 104.

Method 900 follows with holding the blade in a second position for a second time period at block 908. In this position, the second static blade attitude measurements are determined as described with respect to block 612 of method 600. In some embodiments, the second position corresponds to the position of highest lift supported by attachment member 104, so that blade 106 and attachment member 104 are held fixed at the point of highest height relative to the surface. In these embodiments, the second static blade attitude measurements enable the determination of the maximum lift angle as described with respect to block 802 of method 800. The second time period can be defined as the same duration as the first time period (e.g., 10 seconds), but generally can differ as required.

At block 910, method 900 operates the blade to a first swing motion. This swinging motion can be made corresponding to the point of highest lift, after holding the blade at block 908. In some embodiments, the first swing motion is defined with respect to one direction (e.g., swinging blade 106 left relative to attachment member 104). During this swinging motion, blade sensors 204 can determine the first set of dynamic blade attitude measurements (e.g., the dynamic attitude measurements during a left swinging movement of the blade 106), as described with respect to block 804 of method 800. After swinging blade 106, method 900 then holds blade 106 in a third position at block 912. In the leftward swinging motion previously described, the third position may correspond to the leftward-most point of blade 106 supported by attachment member 104. In holding the blade, the pitch offset and/or swing angle of the blade can be determined.

Proceeding to block 914, method 900 operates the blade in a second swing motion. The second swinging motion is defined in a direction opposite to the first swing motion; in the preceding example, the second swing motion is the swinging of blade 106 to the right relative to attachment member 104. During this swinging motion, blade sensors 204 can determine the second set of dynamic blade attitude measurements (e.g., the dynamic attitude measurements during a right swinging movement of the blade 106), as described with respect to block 806 of method 800. Method 900 holds blade 106 in a fourth position at block 916. For example, to determine the maximum swing angle of blade 106, the fourth position is the rightmost-point of blade 106 supported by attachment member 104.

FIG. 10 depicts a flow diagram of a method 1000 for processing calibration data. Method 1000 can be implemented in conjunction with the functions performed with respect to methods 600-900, along with the vehicle functions shown and described in FIGS. 1-5. In some embodiments, method 1000 is executed on a processing device installed on the control panel of vehicle 100, such as workstation device 212 described in FIG. 3. For example, the functions of method 1000 can be included as part of vehicle calibration application 305 stored in memory 304 and executed by at least one processor 302.

Method 1000 includes receiving input of the initial orientation of the blade at block 1002. For example, the input comprises user input entered into workstation device 212 (via HMI 306) that sets the initial orientation of blade 106 (and of attachment member 104). Upon receiving the input, method 1000 sends control signals to one or more operating systems on vehicle 100 that cause blade 106 to be operated to the initial orientation set by the parameters of the input, for example, as described in method 900.

Proceeding to block 1004, method 1000 displays a confirmation message that the blade has been successfully configured in the initial orientation defined by the input received at block 1002. For example, the confirmation message generated at block 1004 (and the confirmation messages further described herein) can be generated by processor 302 and displayed on HMI 306 via display 308.

Method 1000 then receives input to hold blade to a level position at block 1006. In response, method 1000 receives calibrated blade attitude measurements and displays a confirmation message with the calibrated blade attitude measurements at block 1008. These calibrated blade attitude measurements are generated to compensate the level offset angle between level frame and the frame of the blade 106 per its installation position and attitude (see FIG. 7) so that the blade attitude can be represented as level from the perspective of vehicle body 102. At block 1010, method 1000 receives input to lift blade 106. Subsequently or simultaneously with the input received at block 1012, method 1000 receives input to hold blade 106 at the maximum lift angle supported by attachment member 104. After the input is received at block 1010, dynamic blade attitude measurements are determined corresponding to the lifting motion as blade 106 lifts with attachment member 104. These measurements are used for the determination of the at least one second attitude offset of blade 106 (e.g., the roll and yaw offsets) as described with respect to block 608 of method 600. After input to hold the blade at the max lift angle is received at block 1012, static blade attitude measurements are determined as blade 106 remains fixed with attachment member 104.

Method 1000 displays a confirmation message with the first and second attitude offsets of the blade at block 1014. For example, when the first attitude offset is the roll offset of blade 106 and the second attitude offset is the yaw offset of blade 106 as determined in method 600, the values of the roll and yaw offset are received and displayed on HMI 306 in conjunction with performing the calibration procedure of method 600.

Proceeding to block 1018, method 1000 receives input to swing the blade to a first end. For example, the first end can be the left end. This input is used to initiate the swinging motion of blade 106 for determination of the pitch offset of the blade and/or the swing angle. Method 1000 then receives input at block 1020 to hold the blade at the first (e.g., left end) for a designated time period. At this point, blade sensor 204 determines static blade attitude measurements at the first end for determining the pitch offset of blade 106 and optionally the swing angle. Method 1000 displays a confirmation message with the third attitude offset of blade 106 at block 1022.

Method 1000 receives additional input to swing the blade to a second end at block 1024. For example, the second end is the right end with respect to the swinging motion of blade 106, after the blade has finished swinging to the left with respect to attachment member 104. While swinging blade 106 to the first end and the second end, blade sensor 204 determines dynamic blade attitude measurements, as previously described. Then, method 1000 receives input to hold blade 106 at the second end at block 1026. During this time, blade sensor 204 determines static blade attitude measurements, which are used to subsequently determine calibration variables such as the left and right swing angle.

Lastly, method 1000 displays a confirmation message at block 1028 on HMI 306 with the maximum angles of movement of the blade, which in the examples previously described, are the maximum left swing angle and right swing angle. In some embodiments, the calibration process has been fully completed and vehicle 100 is ready for operative use (assuming no errors were generated during the procedure). In some embodiments, the calibration process may include additional steps.

The methods and techniques described herein may be implemented in digital electronic circuitry, or with a programmable processor (for example, a special-purpose processor or a general-purpose processor such as a computer) firmware, software, or in various combinations of each. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instruction to, a data storage system, at least one input device, and at least one output device. Generally, a processor will receive instructions and data from a read-only memory and/or a random-access memory. Storage devices suitable for tangibly embodying computer program instructions and data include all forma of non-volatile memory, including by way of example semiconductor memory devices, such as erasable programmable read-only memory (EPROM), electrically-erasable programmable read-only memory (EEPROM), and flash memory devices; magnetic disks such as internal hard disks and removable disks; magneto-optical disks; and the like. Any of the foregoing may be supplemented by, or incorporated in, specially-designed application specific integrated circuits (ASICs).

EXAMPLE EMBODIMENTS

Example 1 includes a method for calibrating a blade attached to a vehicle, wherein the vehicle includes a body and an attachment member that couples the blade to the body, wherein movement of the blade is defined orthogonal to an axis of motion with respect to the attachment member, wherein the attachment member is configured for lift movement, wherein the lift movement is defined as a rotation along a horizontal axis with respect to the body, wherein the blade is configured for swing movement, wherein the swing movement is defined as a rotation along an axis orthogonal to an axis of the lift movement with respect to the attachment member, the method comprising: determining first static blade attitude measurements of the blade for a first period of time in which the blade is held static relative to the attachment member, wherein the first static blade attitude measurements are determined with respect to a first axis of rotation and a second axis of rotation of the blade, wherein the first axis of rotation is defined parallel relative to a first axis of the body, wherein the second axis of rotation is orthogonal to the first axis of rotation and defined parallel to a second axis of the body; determining first dynamic blade attitude measurements of the blade with respect to movement of the blade about the second axis of rotation; determining a first attitude offset of the blade and a second attitude offset of the blade relative to the body based on the first dynamic blade attitude measurements and the first static blade attitude measurements; determining second static blade attitude measurements with respect to the second axis of rotation of the blade for a second period of time in which the blade is held static relative to the attachment member; determining second dynamic blade attitude measurements of the blade with respect to movement of the blade about a third axis of rotation, wherein the third axis of rotation is orthogonal to the first and second axis of rotation and defined parallel to a third axis of the body; determining a third attitude offset of the blade relative to the body based on the second dynamic blade attitude measurements and the first static blade attitude measurements.

Example 2 includes the method of Example 1, further comprising: determining a first maximum angle of movement of the blade with respect to the body based on the first static blade attitude measurements and the second static blade attitude measurements; wherein determining the second dynamic blade attitude measurements comprises: determining a first set of dynamic blade attitude measurements with respect to the third axis of rotation of the blade in which the blade swings in a first direction relative to the attachment member; determining a second set of dynamic blade attitude measurements with respect to the third axis of rotation of the blade in which the blade swings in a second direction relative to the attachment member; determining a second maximum angle of movement of the blade with respect to the body based on the first set of dynamic blade attitude measurements; and determining a third maximum angle of movement of the blade with respect to the body based on the second set of dynamic blade attitude measurements.

Example 3 includes the method of any of Examples 1-2, wherein determining the first static blade attitude measurements comprises: determining first raw blade attitude measurements in a frame of the blade; determining a level attitude offset of the body with respect to a surface; generating first calibrated blade attitude measurements in the frame of the body based on the first raw blade attitude measurements and the level attitude offset.

Example 4 includes the method of any of Examples 1-3, comprising: determining a level attitude offset with respect to a surface; generating a conversion matrix based on a multiplication of a first rotation matrix representing raw blade attitude measurements with respect to the level attitude offset and a second rotation matrix representing a rotation from the level attitude offset to a frame of the body; determining a set of conversion orientation angles from the conversion matrix representing an orientation of the blade with respect to the body compensated with the level attitude offset; generating calibrated blade attitude measurements with respect to the body based on the set of conversion orientation angles; storing the set of conversion orientation angles in memory.

Example 5 includes the method of any of Examples 1-4, wherein determining a first attitude offset of the blade and a second attitude offset of the blade relative to the body comprises determining a roll offset and a yaw offset of the blade, determining at least one third attitude offset of the blade relative to the body comprises determining a pitch offset of the blade.

Example 6 includes the method of any of Examples 1-5, comprising: setting the blade in an initial orientation according to one or more calibration guidance criterion; holding the blade in a first position for the first period of time to determine the first static blade attitude measurements; operating the attachment member for the lift movement to determine the first dynamic blade attitude measurements; holding the blade in a second position for the second period of time to determine the second static blade attitude measurements and a maximum lift angle; operating the blade in a first swing motion in a first direction to determine the second dynamic blade attitude measurements; holding the blade in a third position for a third period of time to determine a first maximum swing angle; operating the blade in a second swing motion in a second direction; and holding the blade in a fourth position for a fourth period of time to determine a second maximum swing angle of the blade.

Example 7 includes the method of Example 6, comprising: generating and displaying a first confirmation message indicating that the initial orientation of the blade has been set; generating and displaying a second confirmation message indicating that the blade has been successfully held at the first position for the first period of time; generating and displaying a third confirmation message indicating that the blade has been successfully held at the second position for the second period of time; generating and displaying a fourth confirmation message indicating that the blade has been successfully held at the third position for the third period of time; generating and displaying a fifth confirmation message indicating that the blade has been successfully held at the fourth position for the fourth period of time; and displaying the first attitude offset, the second attitude offset, the third attitude offset, the maximum lift angle, the maximum first swing angle, and the maximum second swing angle.

Example 8 includes the method of any of Examples 1-7, comprising: determining static attitude measurements of the attachment member in which the attachment member is held static with the blade; determining dynamic attitude measurements of the attachment member with respect to the lift movement of the attachment member; determining a first attitude offset of the attachment member and a second attitude offset of the attachment member relative to the body based on the static attitude measurements and the dynamic attitude measurements of the attachment member.

Example 9 includes a system configured to be coupled on a vehicle, wherein the vehicle includes a body, a blade, and an attachment member that couples the blade to the body, wherein movement of the blade is defined orthogonal to an axis of motion with respect to the attachment member, wherein the attachment member is configured for lift movement, wherein the lift movement is defined as a rotation along a horizontal axis with respect to the body, wherein the blade is configured for swing movement, wherein the swing movement is defined as a rotation along an axis orthogonal to an axis of the lift movement with respect to the attachment member, the system comprising: at least one first sensor configured to be physically coupled to the blade, wherein the at least one first sensor is configured to determine attitude measurements of the blade; at least one second sensor configured to be physically coupled to the attachment member, wherein the at least one second sensor is configured to determine attitude measurements of the attachment member; and at least one processor integrated in or coupled to the at least one first sensor and the at least one second sensor; wherein the at least one first sensor is configured to determine first static blade attitude measurements with respect to a first axis of rotation of the blade for a first period of time in which the blade is held static relative to the attachment member, wherein the first axis of rotation is defined parallel relative to a first axis of the body, wherein the at least one first sensor is configured to determine first dynamic blade attitude measurements of the blade with respect to movement of the blade about a second axis of rotation, wherein the second axis of rotation is orthogonal to the first axis of rotation and defined parallel to a second axis of the body, wherein the at least one first sensor is configured to determine second static blade attitude measurements with respect to the second axis of rotation of the blade for a second period of time in which the blade is held static relative to the attachment member, wherein the at least one first sensor is configured to determine second dynamic blade attitude measurements of the blade with respect to movement of the blade about a third axis of rotation, wherein the third axis of rotation is orthogonal to the first and second axis of rotation and defined parallel to a third axis of the body, wherein the at least one processor is configured to determine one or more calibration variables based on a combination of the attitude measurements from the at least one first sensor and the attitude measurements from the at least one second sensor, wherein the at least one processor is configured to: determine a first attitude offset of the blade and a second attitude offset of the blade relative to the body based on the first dynamic blade attitude measurements and the first static blade attitude measurements, determine a third attitude offset of the blade relative to the body based on the second dynamic blade attitude measurements and the first static blade attitude measurements.

Example 10 includes the system of Example 9, wherein the at least one first sensor and the at least one second sensor comprise one or more gyroscopes, and/or one or more accelerometers.

Example 11 includes the system of any of Examples 9-10, wherein the at least one first sensor, the at least one second sensor, and the at least one processor are coupled via a controller area network (CAN) bus, and further comprising a global navigation satellite system (GNSS) receiver coupled to the at least one processor, wherein the GNSS receiver provides position and heading information of the body to the at least one processor.

Example 12 includes the system of any of Examples 9-11, further comprising a workstation device coupled to a chassis of the body, wherein the workstation device is coupled to the at least one processor, wherein the workstation device comprises a human-machine interface comprising one or more display screens, wherein the workstation device is configured to execute a vehicle calibration application stored in memory, wherein by executing the vehicle calibration application, the workstation device is configured to receive user input to calibrate the blade and to display the first attitude offset, the second attitude offset, and the third attitude offset on the one or more display screens.

Example 13 includes the system of Example 12, wherein the workstation device is configured to: generate and display a first confirmation message in response to a determination that the blade is set in an initial orientation, wherein the first confirmation message indicates that the initial orientation of the blade has been set; generate and display a second confirmation message in response to a determination that the blade is held at a first position for the first period of time, wherein the second confirmation message indicates that the blade has been successfully held at the first position for the first period of time; generate and display a third confirmation message in response to a determination that the blade is held at a second position for the second period of time, wherein the third confirmation message indicates that the blade has been successfully held at the second position for the second period of time; generate and display a fourth confirmation message in response to a determination that the blade is held at a third position for a third period of time, wherein the fourth confirmation message indicates that the blade has been successfully held at the third position for the third period of time; generate and display a fifth confirmation message in response to a determination that the blade is held at a fourth position for a fourth period of time, wherein the fifth confirmation message indicates that the blade has been successfully held at the fourth position for the fourth period of time.

Example 14 includes the system of any of Examples 9-13, wherein the at least one processor is configured to determine a first maximum angle of movement of the blade with respect to the body based on the first static blade attitude measurements and the second static blade attitude measurements, wherein the at least one processor is configured to determine a first set of dynamic blade attitude measurements with respect to the third axis of rotation of the blade in which the blade swings in a first direction relative to the attachment member, and a second set of dynamic blade attitude measurements with respect to the third axis of rotation of the blade in which the blade swings in a second direction relative to the attachment member, wherein the at least one processor is configured to determine a second maximum angle of movement of the blade with respect to the body based on the first set of dynamic blade attitude measurements; and determine a third maximum angle of movement of the blade with respect to the body based on the second set of dynamic blade attitude measurements.

Example 15 includes the system of any of Examples 9-14, wherein the at least one processor is configured to receive raw blade attitude measurements in a frame of the blade; wherein the at least one processor is configured to determine a level attitude offset of the body with respect to a surface; wherein the at least one processor is configured to generate calibrated blade attitude measurements in the frame of the body based on the raw blade attitude measurements and the level attitude offset.

Example 16 includes the system of any of Examples 9-15, wherein the at least one processor is configured to: determine a level attitude offset with respect to a surface; generate a conversion matrix based on a multiplication of a first rotation matrix representing raw blade attitude measurements with respect to the level attitude offset and a second rotation matrix representing a rotation from the level attitude offset to a frame of the body; determine a set of conversion orientation angles from the conversion matrix representing an orientation of the blade with respect to the body compensated with the level attitude offset; generate calibrated blade attitude measurements with respect to the body based on the set of conversion orientation angles; store the set of conversion orientation angles in memory.

Example 17 includes a vehicle, comprising: a body; a blade; an attachment member coupled on an end of the body and which couples the blade to the body, wherein movement of the blade is defined orthogonal to an axis of motion with respect to the attachment member, wherein the attachment member is configured for lift movement, wherein the lift movement is defined as a rotation along a horizontal axis with respect to the body, wherein the blade is configured for swing movement, wherein the swing movement is defined as a rotation along an axis orthogonal to an axis of the lift movement with respect to the attachment member, at least one first sensor coupled to the blade, wherein the at least one first sensor is configured to determine attitude measurements of the blade; at least one second sensor coupled to the attachment member, wherein the at least one second sensor is configured to determine attitude measurements of the attachment member; and at least one processor integrated in or coupled to the at least one first sensor and the at least one second sensor; wherein the at least one first sensor is configured to determine first static blade attitude measurements with respect to a first axis of rotation of the blade for a first period of time in which the blade is held static relative to the attachment member, wherein the first axis of rotation is defined parallel relative to a first axis of the body, wherein the at least one first sensor is configured to determine first dynamic blade attitude measurements of the blade with respect to movement of the blade about a second axis of rotation, wherein the second axis of rotation is orthogonal to the first axis of rotation and defined parallel to a second axis of the body, wherein the at least one first sensor is configured to determine second static blade attitude measurements with respect to the second axis of rotation of the blade for a second period of time in which the blade is held static relative to the attachment member, wherein the at least one first sensor is configured to determine second dynamic blade attitude measurements of the blade with respect to movement of the blade about a third axis of rotation, wherein the third axis of rotation is orthogonal to the first and second axis of rotation and defined parallel to a third axis of the body, wherein the at least one processor is configured to determine one or more calibration variables based on a combination of the attitude measurements from the at least one first sensor and the attitude measurements from the at least one second sensor, wherein the at least one processor is configured to: determine a first attitude offset of the blade and a second attitude offset of the blade relative to the body based on the first dynamic blade attitude measurements and the first static blade attitude measurements, determine a third attitude offset of the blade relative to the body based on the second dynamic blade attitude measurements and the first static blade attitude measurements.

Example 18 includes the vehicle of Example 17, wherein the at least one processor is configured to determine a first maximum angle of movement of the blade with respect to the body based on the first static blade attitude measurements and the second static blade attitude measurements, wherein the at least one processor is configured to determine a first set of dynamic blade attitude measurements with respect to the third axis of rotation of the blade in which the blade swings in a first direction relative to the attachment member, and a second set of dynamic blade attitude measurements with respect to the third axis of rotation of the blade in which the blade swings in a second direction relative to the attachment member, wherein the at least one processor is configured to determine a second maximum angle of movement of the blade with respect to the body based on the first set of dynamic blade attitude measurements; and determine a third maximum angle of movement of the blade with respect to the body based on the second set of dynamic blade attitude measurements.

Example 19 includes the vehicle of any of Examples 17-18, wherein the at least one processor is configured to receive raw blade attitude measurements; wherein the at least one processor is configured to determine a level attitude offset of the body with respect to a surface; wherein the at least one processor is configured to generate calibrated blade attitude measurements in the frame of the body based on the raw blade attitude measurements and the level attitude offset.

Example 20 includes the vehicle of any of Examples 17-19, wherein the at least one first sensor and the at least one second sensor comprise one or more gyroscopes, and/or one or more accelerometers.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method for calibrating a blade attached to a vehicle, wherein the vehicle includes a body and an attachment member that couples the blade to the body, wherein movement of the blade is defined orthogonal to an axis of motion with respect to the attachment member, wherein the attachment member is configured for lift movement, wherein the lift movement is defined as a rotation along a horizontal axis with respect to the body, wherein the blade is configured for swing movement, wherein the swing movement is defined as a rotation along an axis orthogonal to an axis of the lift movement with respect to the attachment member, the method comprising:

determining first static blade attitude measurements of the blade for a first period of time in which the blade is held static with respect to the attachment member, wherein the first static blade attitude measurements are determined with respect to a first axis of rotation and a second axis of rotation of the blade, wherein the first axis of rotation is defined parallel with respect to a first axis of the body, wherein the second axis of rotation is orthogonal to the first axis of rotation and defined parallel to a second axis of the body;

determining first dynamic blade attitude measurements of the blade with respect to movement of the blade about the second axis of rotation;

determining a first attitude offset of the blade and a second attitude offset of the blade with respect to the body based on the first dynamic blade attitude measurements and the first static blade attitude measurements;

determining second static blade attitude measurements with respect to the second axis of rotation of the blade for a second period of time in which the blade is held static with respect to the attachment member;

determining second dynamic blade attitude measurements of the blade with respect to movement of the blade about a third axis of rotation, wherein the third axis of rotation is orthogonal to the first and second axis of rotation and defined parallel to a third axis of the body; and determining a third attitude offset of the blade with respect to the body based on the second dynamic blade attitude measurements and the first static blade attitude measurements;

wherein the first attitude offset of the blade is a roll offset of the blade, the second attitude offset of the blade is a yaw offset of the blade, and the third attitude offset of the blade is a pitch offset of the blade, wherein:

$$g_x = [\cos(\Delta\psi_b) * \sin(\Delta\theta_s + \Delta\theta_b) * \cos(\Delta\varphi_b)] * \omega_z$$

$$g_y = [-\cos(\Delta\psi_b) * \sin(\Delta\varphi_b)] * \omega_z$$

$$g_z = [\cos(\Delta\theta_s + \Delta\theta_b) * \cos(\Delta\varphi_b)] * \omega_z$$

where the roll offset is $\Delta\varphi_b$, the yaw offset is $\Delta\psi b$, the pitch offset is $(\Delta\theta_s + \Delta\theta_b)$, and $\omega_z$ is rotation rate about a z-axis, wherein during movements of the vehicle, a calibration application causes processing circuitry to issue commands and control signals to motor systems on the vehicle in conjunction with the calibrating method, such that the processing circuitry calculates the attitude offsets per the movements and stores the attitude offsets as installation offsets, which are used during normal operation of the vehicle by the processing circuitry to compensate for offsets in attitude calculations.

2. The method of claim 1, further comprising:

determining a first maximum angle of movement of the blade with respect to the body based on the first static blade attitude measurements and the second static blade attitude measurements;

wherein determining the second dynamic blade attitude measurements comprises:

determining a first set of dynamic blade attitude measurements with respect to the third axis of rotation of the blade in which the blade swings in a first direction with respect to the attachment member;

determining a second set of dynamic blade attitude measurements with respect to the third axis of rotation of the blade in which the blade swings in a second direction with respect to the attachment member;

determining a second maximum angle of movement of the blade with respect to the body based on the first set of dynamic blade attitude measurements; and determining a third maximum angle of movement of the blade with respect to the body based on the second set of dynamic blade attitude measurements.

3. The method of claim 1, wherein determining the first static blade attitude measurements comprises:

determining first raw blade attitude measurements in a frame of the blade;

determining a level attitude offset of the body with respect to a surface;

generating first calibrated blade attitude measurements in the frame of the body based on the first raw blade attitude measurements and the level attitude offset.

4. The method of claim 1, comprising:

determining a level attitude offset with respect to a surface;

generating a conversion matrix based on a multiplication of a first rotation matrix representing raw blade attitude measurements with respect to the level attitude offset and a second rotation matrix representing a rotation from the level attitude offset to a frame of the body;

determining a set of conversion orientation angles from the conversion matrix representing an orientation of the blade with respect to the body compensated with the level attitude offset;

generating calibrated blade attitude measurements with respect to the body based on the set of conversion orientation angles;

storing the set of conversion orientation angles in memory.

5. The method of claim 1, further comprising:

setting the blade in an initial orientation according to one or more calibration guidance criterion;

holding the blade in a first position for the first period of time to determine the first static blade attitude measurements;

operating the attachment member for the lift movement to determine the first dynamic blade attitude measurements;

holding the blade in a second position for the second period of time to determine the second static blade attitude measurements and a maximum lift angle;

operating the blade in a first swing motion in a first direction to determine the second dynamic blade attitude measurements;

holding the blade in a third position for a third period of time to determine a first maximum swing angle;

operating the blade in a second swing motion in a second direction; and holding the blade in a fourth position for a fourth period of time to determine a second maximum swing angle of the blade.

6. The method of claim 5, further comprising:

generating and displaying a first confirmation message indicating that the initial orientation of the blade has been set;

generating and displaying a second confirmation message indicating that the blade has been successfully held at the first position for the first period of time;

generating and displaying a third confirmation message indicating that the blade has been successfully held at the second position for the second period of time;

generating and displaying a fourth confirmation message indicating that the blade has been successfully held at the third position for the third period of time;

generating and displaying a fifth confirmation message indicating that the blade has been successfully held at the fourth position for the fourth period of time; and displaying the first attitude offset, the second attitude offset, the third attitude offset, the maximum lift angle, the maximum first swing angle, and the maximum second swing angle.

7. The method of claim 1, further comprising:

determining static attitude measurements of the attachment member in which the attachment member is held static with the blade;

determining dynamic attitude measurements of the attachment member with respect to the lift movement of the attachment member; and determining a first attitude offset of the attachment member and a second attitude offset of the attachment member with respect to the body based on the static attitude measurements and the dynamic attitude measurements of the attachment member.

8. A system configured to be coupled on a vehicle, wherein the vehicle includes a body, a blade, and an attachment member that couples the blade to the body, wherein movement of the blade is defined orthogonal to an axis of motion with respect to the attachment member, wherein the attachment member is configured for lift movement, wherein the lift movement is defined as a rotation along a horizontal axis with respect to the body, wherein the blade is configured for swing movement, wherein the swing movement is defined as a rotation along an axis orthogonal to an axis of the lift movement with respect to the attachment member, the system comprising:

at least one first sensor configured to be physically coupled to the blade, wherein the at least one first sensor is configured to determine attitude measurements of the blade;

at least one second sensor configured to be physically coupled to the attachment member, wherein the at least one second sensor is configured to determine attitude measurements of the attachment member; and at least one processor integrated in or coupled to the at least one first sensor and the at least one second sensor, wherein the at least one processor is operative to perform a method for calibrating the blade;

wherein the at least one first sensor is configured to determine first static blade attitude measurements with respect to a first axis of rotation of the blade for a first period of time in which the blade is held static with respect to the attachment member, wherein the first axis of rotation is defined parallel with respect to a first axis of the body, wherein the at least one first sensor is configured to determine first dynamic blade attitude measurements of the blade with respect to movement of the blade about a second axis of rotation, wherein the second axis of rotation is orthogonal to the first axis of rotation and defined parallel to a second axis of the body, wherein the at least one first sensor is configured to determine second static blade attitude measurements with respect to the second axis of rotation of the blade for a second period of time in which the blade is held static with respect to the attachment member, wherein the at least one first sensor is configured to determine second dynamic blade attitude measurements of the blade with respect to movement of the blade about a third axis of rotation, wherein the third axis of rotation is orthogonal to the first and second axis of rotation and defined parallel to a third axis of the body, wherein the at least one processor is configured to determine one or more calibration variables based on a combination of the attitude measurements from the at least one first sensor and the attitude measurements from the at least one second sensor, wherein the at least one processor is configured to:

determine a first attitude offset of the blade and a second attitude offset of the blade with respect to the body based on the first dynamic blade attitude measurements and the first static blade attitude measurements, determine a third attitude offset of the blade with respect to the body based on the second dynamic blade attitude measurements and the first static blade attitude measurements;

wherein the first attitude offset of the blade is a roll offset of the blade, the second attitude offset of the blade is a yaw offset of the blade, and the third attitude offset of the blade is a pitch offset of the blade, wherein:

$$g_x=[\cos(\Delta\psi_b)*\sin(\Delta\theta_s+\Delta\theta_b)*\cos(\Delta\varphi_b)]*\omega_z$$

$$g_y=[-\cos(\Delta\psi_b)*\sin(\Delta\varphi_b)]*\omega_z$$

$$g_z=[\cos(\Delta\theta_s+\Delta\theta_b)*\cos(\Delta\varphi_b)]*\omega_z$$

where the roll offset is $\Delta\varphi_b$, the yaw offset is $\Delta\psi_p$, the pitch offset is $(\Delta\theta_s+\Delta\theta_p)$, and $\omega_z$ is rotation rate about a z-axis, wherein during movements of the vehicle, a calibration application causes the at least one processor to issue commands and control signals to motor systems on the vehicle in conjunction with the calibrating method, such that the at least one processor calculates the attitude offsets per the movements and stores the attitude offsets as installation offsets.

9. The system of claim 8, wherein the at least one first sensor and the at least one second sensor comprise one or more gyroscopes, and/or one or more accelerometers.

10. The system of claim 8, wherein the at least one first sensor, the at least one second sensor, and the at least one processor are coupled via a controller area network (CAN) bus, and further comprising a global navigation satellite system (GNSS) receiver coupled to the at least one processor, wherein the GNSS receiver provides position and heading information of the body to the at least one processor.

11. The system of claim 8, further comprising a workstation device coupled to a chassis of the body, wherein the workstation device is coupled to the at least one processor, wherein the workstation device comprises a human-machine interface comprising one or more display screens, wherein the workstation device is configured to execute the calibration application, which is stored in memory, wherein by executing the calibration application, the workstation device is configured to receive user input to calibrate the blade and to display the first attitude offset, the second attitude offset, and the third attitude offset on the one or more display screens.

12. The system of claim 11, wherein the workstation device is configured to:

generate and display a first confirmation message in response to a determination that the blade is set in an initial orientation, wherein the first confirmation message indicates that the initial orientation of the blade has been set;

generate and display a second confirmation message in response to a determination that the blade is held at a first position for the first period of time, wherein the second confirmation message indicates that the blade has been successfully held at the first position for the first period of time;

generate and display a third confirmation message in response to a determination that the blade is held at a second position for the second period of time, wherein the third confirmation message indicates that the blade has been successfully held at the second position for the second period of time;

generate and display a fourth confirmation message in response to a determination that the blade is held at a third position for a third period of time, wherein the fourth confirmation message indicates that the blade has been successfully held at the third position for the third period of time;

generate and display a fifth confirmation message in response to a determination that the blade is held at a fourth position for a fourth period of time, wherein the fifth confirmation message indicates that the blade has been successfully held at the fourth position for the fourth period of time.

13. The system of claim 8, wherein the at least one processor is configured to determine a first maximum angle of movement of the blade with respect to the body based on the first static blade attitude measurements and the second static blade attitude measurements, wherein the at least one processor is configured to determine a first set of dynamic blade attitude measurements with respect to the third axis of rotation of the blade in which the blade swings in a first direction with respect to the attachment member, and a second set of dynamic blade attitude measurements with respect to the third axis of rotation of the blade in which the blade swings in a second direction with respect to the attachment member, wherein the at least one processor is configured to determine a second maximum angle of movement of the blade with respect to the body based on the first set of dynamic blade attitude measurements; and determine a third maximum angle of movement of the blade with respect to the body based on the second set of dynamic blade attitude measurements.

14. The system of claim 8, wherein the at least one processor is configured to receive raw blade attitude measurements in a frame of the blade;

wherein the at least one processor is configured to determine a level attitude offset of the body with respect to a surface;

wherein the at least one processor is configured to generate calibrated blade attitude measurements in the frame of the body based on the raw blade attitude measurements and the level attitude offset.

15. The system of claim 8, wherein the at least one processor is configured to:

determine a level attitude offset with respect to a surface;

generate a conversion matrix based on a multiplication of a first rotation matrix representing raw blade attitude measurements with respect to the level attitude offset and a second rotation matrix representing a rotation from the level attitude offset to a frame of the body;

determine a set of conversion orientation angles from the conversion matrix representing an orientation of the blade with respect to the body compensated with the level attitude offset;

generate calibrated blade attitude measurements with respect to the body based on the set of conversion orientation angles;

store the set of conversion orientation angles in memory.

16. A vehicle, comprising:

a body;

a blade;

an attachment member coupled on an end of the body and which couples the blade to the body, wherein movement of the blade is defined orthogonal to an axis of motion with respect to the attachment member, wherein the attachment member is configured for lift movement, wherein the lift movement is defined as a rotation along a horizontal axis with respect to the body, wherein the blade is configured for swing movement, wherein the swing movement is defined as a rotation along an axis orthogonal to an axis of the lift movement with respect to the attachment member, at least one first sensor coupled to the blade, wherein the at least one first sensor is configured to determine attitude measurements of the blade;

at least one second sensor coupled to the attachment member, wherein the at least one second sensor is configured to determine attitude measurements of the attachment member; and at least one processor integrated in or coupled to the at least one first sensor and the at least one second sensor, wherein the at least one processor is operative to perform a method for calibrating the blade;

wherein the at least one first sensor is configured to determine first static blade attitude measurements with respect to a first axis of rotation of the blade for a first period of time in which the blade is held static with respect to the attachment member, wherein the first axis of rotation is defined parallel with respect to a first axis of the body, wherein the at least one first sensor is configured to determine first dynamic blade attitude measurements of the blade with respect to movement of the blade about a second axis of rotation, wherein the second axis of rotation is orthogonal to the first axis of rotation and defined parallel to a second axis of the body, wherein the at least one first sensor is configured to determine second static blade attitude measurements with respect to the second axis of rotation of the blade for a second period of time in which the blade is held static with respect to the attachment member, wherein the at least one first sensor is configured to determine second dynamic blade attitude measurements of the blade with respect to movement of the blade about a third axis of rotation, wherein the third axis of rotation is orthogonal to the first and second axis of rotation and defined parallel to a third axis of the body, wherein the at least one processor is configured to determine one or more calibration variables based on a combination of the attitude measurements from the at least one first sensor and the attitude measurements from the at least one second sensor, wherein the at least one processor is configured to:

determine a first attitude offset of the blade and a second attitude offset of the blade with respect to the body based on the first dynamic blade attitude measurements and the first static blade attitude measurements;

determine a third attitude offset of the blade with respect to the body based on the second dynamic blade attitude measurements and the first static blade attitude measurements;

wherein the first attitude offset of the blade is a roll offset of the blade, the second attitude offset of the blade is a yaw offset of the blade, and the third attitude offset of the blade is a pitch offset of the blade, wherein:

$$g_x = [\cos(\Delta\psi_b) * \sin(\Delta\theta_s + \Delta\theta_b) * \cos(\Delta\varphi_b)] * \omega_z$$

$$g_y = [-\cos(\Delta\psi_b) * \sin(\Delta\varphi_b)] * \omega_z$$

$$g_z = [\cos(\Delta\theta_s + \Delta\theta_b) * \cos(\Delta\varphi_b)] * \omega_z$$

where the roll offset is $\Delta\varphi_b$, the yaw offset is $\Delta\psi_b$, the pitch offset is $(\Delta\theta_s + \Delta\theta_b)$, and $\omega_z$ is rotation rate about a z-axis, wherein during movements of the vehicle, a calibration application causes the at least one processor to issue commands and control signals to motor systems on the vehicle in conjunction with the calibrating method, such that the at least one processor calculates the attitude offsets per the movements and stores the attitude offsets as installation offsets.

17. The vehicle of claim 16, wherein the at least one processor is configured to determine a first maximum angle of movement of the blade with respect to the body based on the first static blade attitude measurements and the second static blade attitude measurements, wherein the at least one processor is configured to determine a first set of dynamic blade attitude measurements with respect to the third axis of rotation of the blade in which the blade swings in a first direction with respect to the attachment member, and a second set of dynamic blade attitude measurements with respect to the third axis of rotation of the blade in which the blade swings in a second direction with respect to the attachment member, wherein the at least one processor is configured to determine a second maximum angle of movement of the blade with respect to the body based on the first set of dynamic blade attitude measurements; and determine a third maximum angle of movement of the blade with respect to the body based on the second set of dynamic blade attitude measurements.

18. The vehicle of claim 16, wherein the at least one processor is configured to receive raw blade attitude measurements in a frame of the blade;

wherein the at least one processor is configured to determine a level attitude offset of the body with respect to a surface;

wherein the at least one processor is configured to generate calibrated blade attitude measurements in the frame of the body based on the raw blade attitude measurements and the level attitude offset.

19. The vehicle of claim 16, wherein the at least one first sensor and the at least one second sensor comprise one or more gyroscopes, and/or one or more accelerometers.

* * * * *